(12) United States Patent
Yoshii

(10) Patent No.: US 7,643,095 B2
(45) Date of Patent: Jan. 5, 2010

(54) IMAGE DISPLAY DEVICE, IMAGE DISPLAY METHOD, AND TELEVISION RECEIVER

(75) Inventor: Takashi Yoshii, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 589 days.

(21) Appl. No.: 11/137,428

(22) Filed: May 26, 2005

(65) Prior Publication Data

US 2005/0264702 A1 Dec. 1, 2005

(30) Foreign Application Priority Data

| May 28, 2004 | (JP) | .................... | 2004-158517 |
| Jan. 25, 2005 | (JP) | .................... | 2005-016218 |
| Feb. 3, 2005 | (JP) | .................... | 2005-027177 |
| Mar. 14, 2005 | (JP) | .................... | 2005-070439 |
| Mar. 17, 2005 | (JP) | .................... | 2005-076171 |

(51) Int. Cl.
*H04N 5/57* (2006.01)

(52) U.S. Cl. .................... 348/687; 348/554; 348/569

(58) Field of Classification Search .......... 348/687–689, 348/678–679, 706, 705, 553–570; 345/82–107, 345/690; 362/97.1–97.3; 725/38
See application file for complete search history.

(56) References Cited

U.S. PATENT DOCUMENTS

| 5,790,096 A * | 8/1998 | Hill, Jr. .................... | 345/600 |
| 6,618,042 B1 * | 9/2003 | Powell ..................... | 345/204 |
| 6,809,776 B1 * | 10/2004 | Simpson .................. | 348/565 |
| 6,839,048 B2 * | 1/2005 | Park ......................... | 345/102 |
| 2001/0013854 A1 * | 8/2001 | Ogoro ...................... | 345/102 |
| 2004/0183765 A1 * | 9/2004 | Morisawa ................. | 345/89 |
| 2005/0179821 A1 * | 8/2005 | Suga et al. ................ | 348/687 |

FOREIGN PATENT DOCUMENTS

| JP | 8-30247 A | 2/1996 |
| JP | 8-111822 A | 4/1996 |
| JP | 10-42205 A | 2/1998 |
| JP | 11-306117 A | 11/1999 |
| JP | 11-308544 A | 11/1999 |
| JP | 2001-103388 A | 4/2001 |
| JP | 2001-186436 A | 7/2001 |
| JP | 2001-275051 A | 10/2001 |
| JP | 2002-199244 A | 7/2002 |
| JP | 2002-359789 A | 12/2002 |
| JP | 2003-44024 A | 2/2003 |
| JP | 2003-143433 A | 5/2003 |

* cited by examiner

*Primary Examiner*—M. Lee
(74) *Attorney, Agent, or Firm*—Birch, Stewart, Kolasch & Birch, LLP

(57) ABSTRACT

An image display device controls a screen luminance to an appropriate value in response to switching of a display mode, thereby displaying each of television broadcast program images and graphic user interface images (including an electronic program guide, and a variety of setting menus) in an easy-to-see and power-saving manner. The image display device switches between a mode of displaying the television image and a mode of displaying the graphic user interface image. In response to the mode switching instruction, the device controls variably luminance intensity of a backlight source, thereby providing a screen luminance appropriate for each mode.

17 Claims, 34 Drawing Sheets

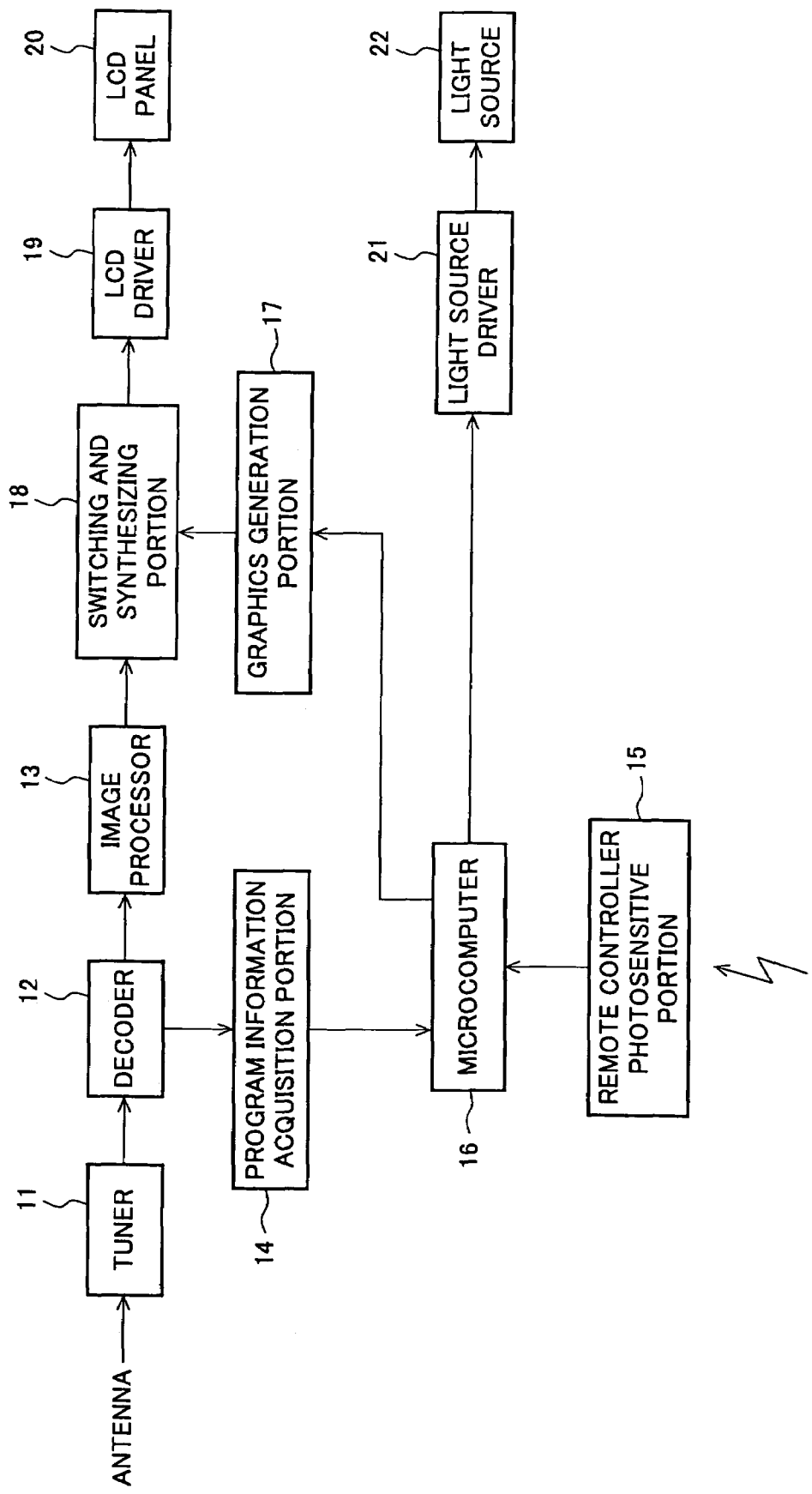

SETTING MENU DISPLAY SCREEN EXAMPLE 1

SETTING MENU DISPLAY SCREEN EXAMPLE 2

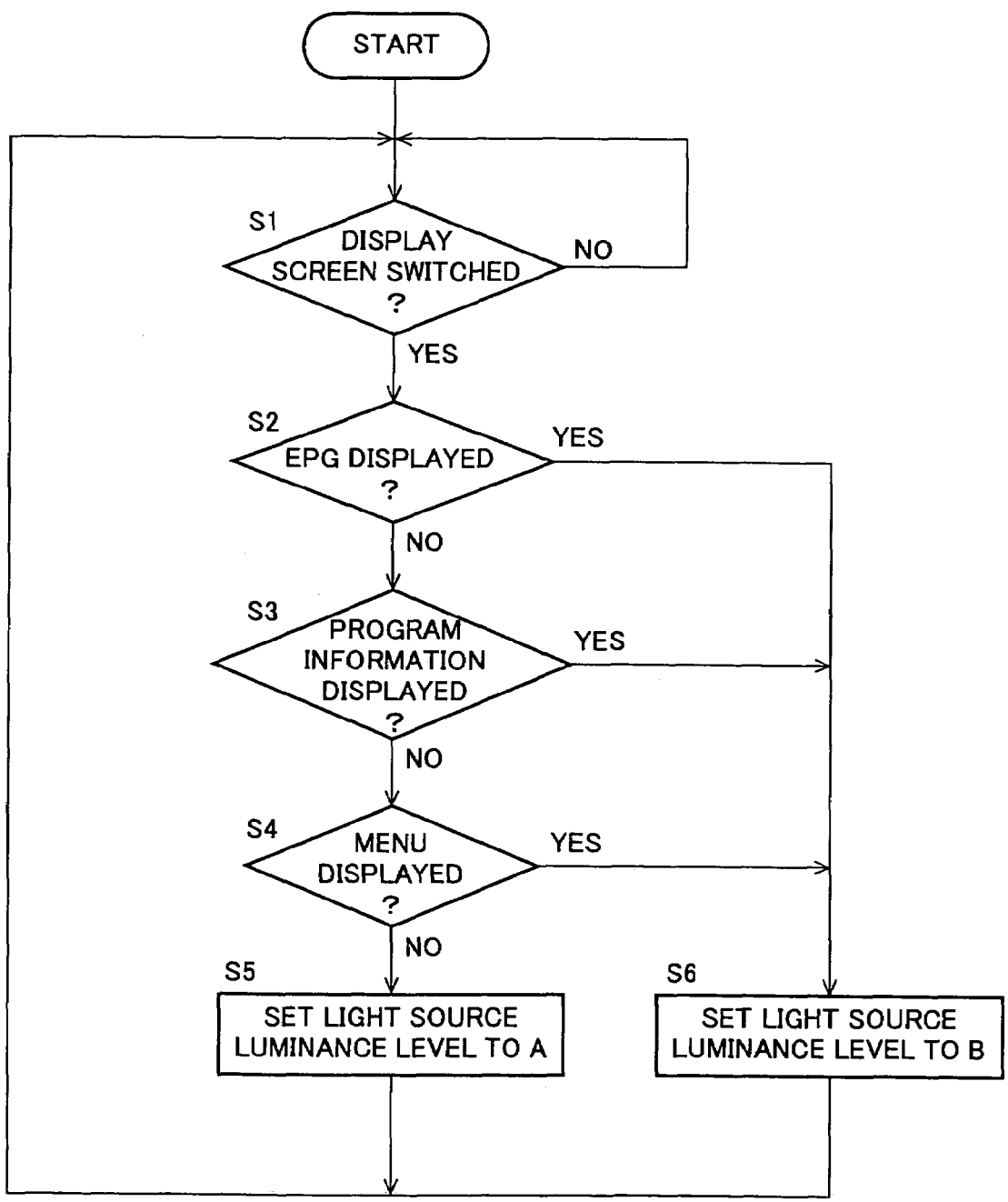

FIG.14

|  | AMBIENT ILLUMINANCE | | |
|---|---|---|---|
| DISPLAY SCREEN | | LIGHT | STANDARD | DARK |
| TV PROGRAM VIDEO DISPLAY SCREEN | LIGHT SOURCE LUMINANCE LEVEL=$A_1$ | LIGHT SOURCE LUMINANCE LEVEL=$A_2$ | LIGHT SOURCE LUMINANCE LEVEL=$A_3$ |
| GUI DISPLAY SCREEN | LIGHT SOURCE LUMINANCE LEVEL=$B_1$ | LIGHT SOURCE LUMINANCE LEVEL=$B_2$ | LIGHT SOURCE LUMINANCE LEVEL=$B_3$ |

$A_1 > A_2 > A_3$
$B_1 > B_2 > B_3$
$A_1 > B_1 \quad A_2 > B_2 \quad A_3 > B_3$

FIG.20

| | AMBIENT ILLUMINANCE | | |
|---|---|---|---|
| | LIGHT | STANDARD | DARK |
| TV VIDEO DISPLAY MODE | LIGHT SOURCE LUMINANCE LEVEL=$A_1$ | LIGHT SOURCE LUMINANCE LEVEL=$A_2$ | LIGHT SOURCE LUMINANCE LEVEL=$A_3$ |
| PC VIDEO DISPLAY MODE | LIGHT SOURCE LUMINANCE LEVEL=$B_1$ | LIGHT SOURCE LUMINANCE LEVEL=$B_2$ | LIGHT SOURCE LUMINANCE LEVEL=$B_3$ |

(DISPLAY MODE on the left)

$A_1 > A_2 > A_3$
$B_1 > B_2 > B_3$
$A_1 > B_1 \quad A_2 > B_2 \quad A_3 > B_3$

FIG.27

|  | AMBIENT ILLUMINANCE | | |
|---|---|---|---|
| DISPLAY SCREEN | LIGHT | STANDARD | DARK |
| TV PROGRAM VIDEO DISPLAY SCREEN | LIGHT SOURCE LUMINANCE LEVEL=$A_1$ | LIGHT SOURCE LUMINANCE LEVEL=$A_2$ | LIGHT SOURCE LUMINANCE LEVEL=$A_3$ |
| CHARACTER INPUT SCREEN | LIGHT SOURCE LUMINANCE LEVEL=$B_1$ | LIGHT SOURCE LUMINANCE LEVEL=$B_2$ | LIGHT SOURCE LUMINANCE LEVEL=$B_3$ |

$A_1 > A_2 > A_3$
$B_1 > B_2 > B_3$
$A_1 > B_1 \quad A_2 > B_2 \quad A_3 > B_3$

FIG.34

| | AMBIENT ILLUMINANCE | | |
|---|---|---|---|
| | LIGHT | STANDARD | DARK |
| TV BROADCAST | LIGHT SOURCE LUMINANCE LEVEL=$A_1$ | LIGHT SOURCE LUMINANCE LEVEL=$A_2$ | LIGHT SOURCE LUMINANCE LEVEL=$A_3$ |
| DATA BROADCAST | LIGHT SOURCE LUMINANCE LEVEL=$B_1$ | LIGHT SOURCE LUMINANCE LEVEL=$B_2$ | LIGHT SOURCE LUMINANCE LEVEL=$B_3$ |
| RADIO BROADCAST | LIGHT SOURCE LUMINANCE LEVEL=$C_1$ | LIGHT SOURCE LUMINANCE LEVEL=$C_2$ | LIGHT SOURCE LUMINANCE LEVEL=$C_3$ |

BROADCAST TYPE $A_1 > A_2 > A_3$
$B_1 > B_2 > B_3$
$C_1 > C_2 > C_3$
$A_1 > B_1 > C_1 \quad A_2 > B_2 > C_2 \quad A_3 > B_3 > C_3$

IMAGE DISPLAY DEVICE, IMAGE DISPLAY METHOD, AND TELEVISION RECEIVER

CROSS-NOTING PARAGRAPH

This non-provisional application claims priority under 35 U.S.C. §119(a) on Patent Applications No. 2004-158517 filed in JAPAN on May 28, 2004, No. 2005-016218 filed in JAPAN on Jan. 25, 2005, No. 2005-027177 filed in JAPAN on Feb. 3, 2005, No. 2005-070439 filed in JAPAN on Mar. 14, 2005, and No. 2005-076171 filed in JAPAN on Mar. 17, 2005, the entire contents of which are hereby incorporated herein by reference.

BACKGROUND OF THE INVENTION

1. Field of the Invention

The present invention relates to an image display device and an image display method for displaying a selected video on a screen thereof by switching between a television program video screen and a graphic user interface video screen, between a television video signal and a computer video signal, or between a television program video screen and a screen for inputting character. The present invention also relates to a television receiver and an image display method for receiving a plurality of broadcast types and displaying a program video of the received broadcast type.

2. Description of the Related Art

Television receivers typically display a television program guide and a variety of setting menus in a graphic user interface (GUI) in addition to ordinary television programs.

For example, Japanese Laid-Open Patent Publication No. 2001-103388 and Japanese Laid-Open Patent Publication No. 2001-186436 disclose digital television receivers. The television receivers acquire television program information from digital data transmitted from a broadcasting station, produce an electronic program guide (EPG) by analyzing the program information, and display the EPG on a display screen thereof via an on screen display (OSD) circuit. The television receivers thus can assist users in the selection of a television program.

Japanese Laid-Open Patent Publication No. 2002-359789 discloses another digital television receiver. The television receiver acquires program information from a television signal decoded by a decoding circuit, produces graphic data of a program information screen by analyzing the program information, and displays the program information screen in an OSD fashion by overlaying a television signal that has been subjected to predetermined image processing. Users thus can acquire, for example, various descriptions of a program prior to or in the middle of a view operation.

Further, Japanese Laid-Open Patent Publication No. 2003-143433 discloses a digital television receiver that displays a variety of setting menus of television and an electronic program guide as a GUI screen.

Japanese Laid-Open Patent Publications Nos. H8-111822, H8-30247, and 2003-44024 disclose television receivers that are connected to a personal computer (PC) and can display a computer video in addition to ordinary television videos. Japanese Laid-Open Patent Publication No. H10-42205 discloses a television receiver that, with the Internet connected thereto via communication means such as a modem, can display a computer video screen (Internet browser screen) in addition to ordinary television video screens.

Japanese Laid-Open Patent Publications Nos. 11-306117 and 2002-199244 disclose television receivers that, with the Internet connected thereto via communication means such as a modem, can display a computer video, such as an Internet browser screen and an electronic mail browser screen, in addition to ordinary television video.

Japanese Laid-Open Patent Publication No. H11-308544 discloses another television receiver. The television receiver displays, on a screen thereof, a software keyboard containing alphabet characters and Japanese kana syllabary to input characters on an Internet browser screen and an electronic mail browser screen. With a remote controller operated, the television receiver receives desired characters and symbols.

FIG. 1 illustrates a schematic structure of a conventional television receiver. The television receiver includes a tuner 1 for selecting a desired channel from a television broadcast wave received by an antenna, a television signal processor 2 for separating a received television signal (composite signal) selected by the tuner 1 into YC separate signals (a luminance signal Y and color signals C) and converting the signals into the primary color signals R, G, and B to output, and an Internet processor 3, having a so-called dial-up connection function, for connecting the television receiver to the Internet via a server of a provider through a communication line.

The television receiver further includes a remote controller photosensitive portion 4 for receiving a command signal input on a remote controller (not shown) by a user, and a microcomputer 5 for detecting and analyzing the command signal received by the remote controller photosensitive portion 4, and issuing predetermined control signals to the tuner 1, the television signal processor 2, etc. In response to the operational command from the user, the microcomputer 5 controls the Internet processor 3 to connect the television receiver to the Internet, acquires content data via a desired uniform resource locator (URL), converts the content data into the RGB video signal, and exchanges data of electronic mails.

The television receiver further includes a switching and synthesizing portion 6 for selectively switching between an RGB signal (television video signal) obtained by the television signal processor 2 and an RGB signal output from the microcomputer 5, or synthesizing the RGB signal from the television signal processor 2 and the RGB signal from the microcomputer 5 for output. The switching and synthesizing portion 6 is controlled for switching and synthesizing by the microcomputer 5.

If an "Internet" function is selected on the remote controller by the user, the microcomputer 5 controls the Internet processor 3 to connect the television receiver to the Internet for interactive communications. The microcomputer 5 also controls the switching and synthesizing portion 6 to display an Internet browser screen of FIG. 2.

Similarly, if an "electronic mail" function is selected on the remote controller by the user, the microcomputer 5 controls the switching and synthesizing portion 6 to display an electronic mail browser screen of FIG. 3. At the same time, the microcomputer 5 controls the Internet processor 3 to connect the television receiver to the Internet to exchange electronic mails.

If the user called a "software keyboard" by operating the remote controller in order to enter characters on one of the Internet browser screen and the electronic mail browser screen, the microcomputer 5 outputs a predetermined video signal from an internal memory (not shown) and controls the switching and synthesizing portion 6 to display the software keyboard screen of FIG. 4. The user can input characters easily by operating the remote controller while viewing the software keyboard screen displayed on a display (not shown). Alternatively, without using the software keyboard, the user may enter characters on one of the Internet browser screen and the electronic mail browser screen directly using any of other input means.

Generally, when a browser software program is initiated on the television receiver having the above-referenced Internet connection function, a browser screen is displayed while ordinary television programs are not displayed. When the above-mentioned software keyboard screen is displayed, ordinary television programs are not displayed.

As technology advances in recent years, conventional analog broadcasting is being replaced with digital broadcasting. In Japan, digital broadcasting started with CS broadcasting by communication satellites in 1996, broadcasting satellite (BS) broadcasting digitized in 2000, and terrestrial broadcasting digitized 2004. Digital broadcasting includes a plurality of broadcast types, such as television broadcasting, radio broadcasting, and data broadcasting. By operating a broadcast type switch on a remote controller, for example, the user can select a desired broadcast type, thereby viewing a broadcast program content.

For example, the radio broadcast type includes radio broadcasting for broadcasting a video and data linked thereto, and radio broadcasting for broadcasting audio only. Depending on program, a sound having a compact disk (CD) grade quality can be enjoyed. Data broadcast type includes independent data broadcasting for broadcasting data only, and linked-data broadcasting for broadcasting data linked to one of a digital broadcast television program and a digital broadcast radio program. When a linked-data broadcast program is received, a user may operate a linked-data display key arranged on the remote controller to receive one of a television program and a radio program currently received and display on a screen.

Corresponding to the diversification of broadcast type mentioned above, Japanese Laid-Open Patent Publication No. 2001-275051 discloses a digital broadcast receiver that displays received digital broadcast information and an operational status of the receiver in an easy-to-understand manner. FIGS. 5A and 5B illustrate the disclosed digital broadcast receiver. The digital broadcast receiver includes a received information display 100 arranged on the front center of the body of the receiver. The received information display 100, as a backlight-type liquid crystal display device, detects a resolution and a format of a video signal, and identification information of broadcast type identifying television broadcast type, radio broadcast type, or data broadcast type. In the received information display 100, a microprocessor acquires these pieces of information from a receiving portion and a decoder, and variable controls the emission color of a backlight source. In this way, the user can check the broadcast type currently being received or on air by viewing the emission color of the received information display 100.

On the other hand, liquid crystal display device displaying broadcast video program by employing an LCD panel as passive-type light modulating means are widely used instead of cathode-ray tubes (CRTs) as a television receiver in recent years. The liquid crystal display device includes a pair of transparent substrates having electrodes thereon and a liquid crystal interposed therebetween. By controlling a voltage applied on each of drive electrodes arranged in a matrix, the liquid crystal display controls a group of or an orientation of liquid crystal molecules to change transmittance of an illumination light from a backlight source arranged behind the transparent substrate. The liquid crystal display device thus displays an image on the LCD panel.

A monitor of a personal computer (PC) for displaying a computer video typically works at a screen luminance level of around 250 $cd/m^2$. In contrast, a television receiver for displaying a television video, typically a natural image (live image), needs a luminance level of 450 to 500 $cd/m^2$. In particular, efforts are made to achieve high luminance in the television receiver employing a liquid crystal display, for example, by improving backlight.

The luminance level (luminance intensity) of the backlight source is determined to within a manually-operated adjustment range of a user. Regardless of the type of the input video signal to be displayed, the luminance level remains constant. Thus, if a graphic user interface (GUI) video, which is rather closer to a computer video such as an electronic program guide and a variety of setting menus, is displayed on the television receiver with a high luminance level set for television video displaying, the screen luminance becomes too high and the screen becomes too bright. A long time of viewing such a screen leads to eye fatigue of the user.

A major portion of power consumption of a large liquid crystal display device is attributed to a backlight unit thereof. Also in respect of reduction of environmental burdens, reducing power consumed by the backlight unit is needed.

It is contemplated that the level of a luminance signal to be input to a display panel is controlled through video signal processing of a luminance signal adjusting circuit in response to mode switching between a mode of displaying a television video and a mode of displaying a computer video. With this arrangement, an image may be displayed at a screen luminance comfortable to the user but no power saving effect is expected.

If one of the Internet browser screen, the electronic mail browser screen, and the software keyboard screen, each being a still image requiring character entry and closer to a computer video, is displayed on the television receiver set at a high luminance level for television video displaying, the screen becomes too bright due to much higher screen luminance. A long time of viewing such a screen leads to eye fatigue of the user.

The digital broadcast receiver, disclosed in Japanese Laid-Open Patent Publication No. 2001-275051, changes the color of the backlight of the received information presentation portion providing information relating to reception, such as a receiving channel, in response to the broadcast type currently received. However, the digital broadcast receiver doesn't take into consideration the screen luminance of a video display displaying received video data so that the user eye fatigue and power consumption are not reduced.

SUMMARY OF THE INVENTION

It is an object of the present invention to provide an image display device that consumes less power and displays a television video and a graphic user interface (GUI) video in an easy-to-see manner by controlling the screen thereof to an appropriate luminance level in response to display mode switching.

It is another object of the present invention to provide an image display device that consumes less power and displays a television video and a computer video in an easy-to-see manner by appropriately controlling luminance intensity of a backlight source thereof in response to display mode switching.

It is yet another object of the present invention to provide an image display device that consumes less power and displays a television video and a video of screen for inputting character in an easy-to-see manner by controlling the screen thereof to an appropriate luminance level in response to display mode switching.

It is yet another object of the present invention to provide a television receiver and an image display method that consumes less power and displays a video in an easy-to-see manner by controlling the screen luminance thereof to an appropriate luminance level in response to the broadcast type of a viewed program.

According to a first technical means of the present invention, an image display device switchable between a mode of displaying a television video and a mode of displaying a graphic user interface video, includes a controller which carries out variable control of a screen luminance in response to mode switching.

According to a second technical means of the present invention, the controller preferably varies luminance intensity of a backlight source for backlighting a passive-type light modulator that displays an input video signal.

According to a third technical means of the present invention, the controller preferably slows a rate of change in the screen luminance at the moment of switching from the mode of displaying the television video to the mode of displaying the graphic user interface video.

According to a fourth technical means of the present invention, the mode switching between the mode of displaying the television video and the mode of displaying the graphic user interface video may be performed in response to a screen switch command from a user.

According to a fifth technical means of the present invention, the graphic user interface video is an electronic program guide display video.

According to a sixth technical means of the present invention, the graphic user interface video is a variety of setting menus display video.

According to a seventh technical means of the present invention, an image display method, includes steps of switching between a mode of displaying a television video and a mode of displaying a graphic user interface video, and variable controlling a screen luminance in response to the mode switching.

According to an eighth technical means of the present invention, an image display device switchable between a mode of displaying a television video and a mode of displaying a computer video, includes a passive-type light modulator displaying an input video signal through a backlight source, and a controller which carries out variable control of luminance intensity of the backlight source in response to mode switching.

According to a ninth technical means of the present invention, the controller preferably slows a rate of change in the luminance intensity of the backlight source at the moment of switching from the mode of displaying the television video to the mode of displaying the computer video.

According to a tenth technical means of the present invention, the mode switching between the mode of displaying the television video and the mode of displaying the computer video may be performed based on an input switch command from a user.

According to an eleventh technical means of the present invention, an image display method includes steps of switching between a mode of displaying a television video and a mode of displaying a computer video, and variable controlling, in response to the mode switching, luminance intensity of a backlight source for backlighting a passive-type light modulator that displays an input video signal.

According to a twelfth technical means of the present invention, an image display device switchable between a mode of displaying a television video and a mode of displaying a video for receiving character entry, includes a controller which carries out variable control of a screen luminance thereof in response to the mode switching.

According to a thirteenth technical means of the present invention, the controller preferably varies luminance intensity of a backlight source for backlighting a passive-type light modulator that displays an input video signal.

According to a fourteenth technical means of the present invention, the controller preferably slows a rate of change in the screen luminance at the moment of switching from the mode of displaying the television video to the mode of displaying the video of a screen for inputting character.

According to a fifteenth technical means of the present invention, the mode switching between the mode of displaying the television video and the mode of displaying the video of a screen for inputting character may be performed based on a screen switch command from a user.

According to a sixteenth technical means of the present invention, the screen for inputting the character is an Internet browser screen.

According to a seventeenth technical means of the present invention, the screen for inputting the character is an electronic mail browser screen.

According to an eighteenth technical means of the present invention, the screen for inputting the character is a software keyboard screen.

According to a nineteenth technical means of the present invention, an image display method, includes steps of switching between a mode of displaying a television video and a mode of displaying a video of a screen for inputting character, and variable controlling a screen luminance in response to the mode switching.

According to a twentieth technical means of the present invention, a television receiver includes a receiver receiving a plurality of different types of broadcasts, a display displaying a program video related to the broadcast received by the receiver, and a controller which carries out variable control of a screen luminance of the display in response to a broadcast type of the program video.

According to a twenty-first technical means of the present invention, the plurality of types of broadcasts may include at least a television broadcast and a data broadcast, and the controller may lower the screen luminance in displaying the program video of the data broadcast than the screen luminance in displaying the program video of the television broadcast.

According to a twenty-second technical means of the present invention, the controller may slow a rate of change in the screen luminance at the moment of switching from the program video display of the television broadcast to the program video display of the data broadcast.

According to a twenty-third technical means of the present invention, the plurality of broadcast types may further include a radio broadcast, and the controller may lower the screen luminance in displaying the program video of the radio broadcast than the screen luminance in displaying the program video of the data broadcast.

According to a twenty-fourth technical means of the present invention, the controller may vary luminance intensity of a backlight source for backlighting a passive-type light modulator that displays an input video signal.

According to a twenty-fifth technical means of the present invention, the broadcast type of the program video may be switched based on a switch instruction from a user.

According to twenty-sixth technical means of the present invention, an image display method for displaying program videos of a plurality of broadcast types, includes steps of detecting the broadcast type of a program video to be displayed, and variable controlling a screen luminance in response to the detected broadcast type.

The image display device, the image display method, and the television receiver of the present invention provides the effects described below.

The image display device of the present invention controls the screen luminance to an appropriate level in response to the mode switching between the mode of displaying the television video and the mode of displaying the GUI video. For example, the screen luminance is set to be lower in displaying the GUI video than in displaying the television video. This arrangement not only permits the user to comfortably view the video, thereby freeing the user from eye fatigue, but also performs a power-saving operation.

The image display device of the embodiments of the present invention variable controls the luminance intensity of the backlight source to an appropriate level in response to the mode switching between the mode of displaying the television video and the mode of displaying the computer video. For example, the luminance intensity of the backlight source is set to be lower in displaying the computer video than in displaying the television video. This arrangement not only permits the user to comfortably view the video, thereby freeing the user from eye fatigue, but also performs a power-saving operation.

The image display device of the present invention controls the screen luminance to an appropriate level in response to the mode switching between the mode of displaying the television video and the mode of displaying the video of a screen for inputting character. The screen luminance is, for example, set to be lower in displaying the video of a screen for inputting character than in displaying the television video. This arrangement not only permits the user to comfortably view the video, thereby freeing the user from eye fatigue, but also performs a power-saving operation.

In accordance with the television receiver and the image display method, of the present invention, the screen luminance is controlled to an appropriate level in response to the broadcast type of the program received. For example, the screen luminance is set to be lower when the program video of the data broadcast is displayed than when the program video of the television broadcast is displayed. This arrangement not only permits the user to comfortably view the video, thereby freeing the user from eye fatigue, but also performs a power-saving operation.

BRIEF DESCRIPTION OF THE DRAWINGS

FIG. 6 is a block diagram illustrating a schematic structure of a television receiver in accordance with a first embodiment of the present invention;

FIG. 11 is a flowchart illustrating control operation of the liquid crystal display (LCD) television receiver in accordance with the first embodiment of the present invention;

FIG. 14 illustrates another control operation of the LCD television receiver in accordance with the first embodiment of the present invention;

FIG. 20 illustrates another control operation of the LCD television receiver in accordance with the second embodiment of the present invention;

FIG. 27 illustrates another control operation of the LCD television receiver in accordance with the third embodiment of the present invention;

FIG. 34 illustrates another control operation of the LCD television receiver in accordance with the fourth embodiment of the present invention.

PREFERRED EMBODIMENTS OF THE INVENTION

First Embodiment

Figure 7:
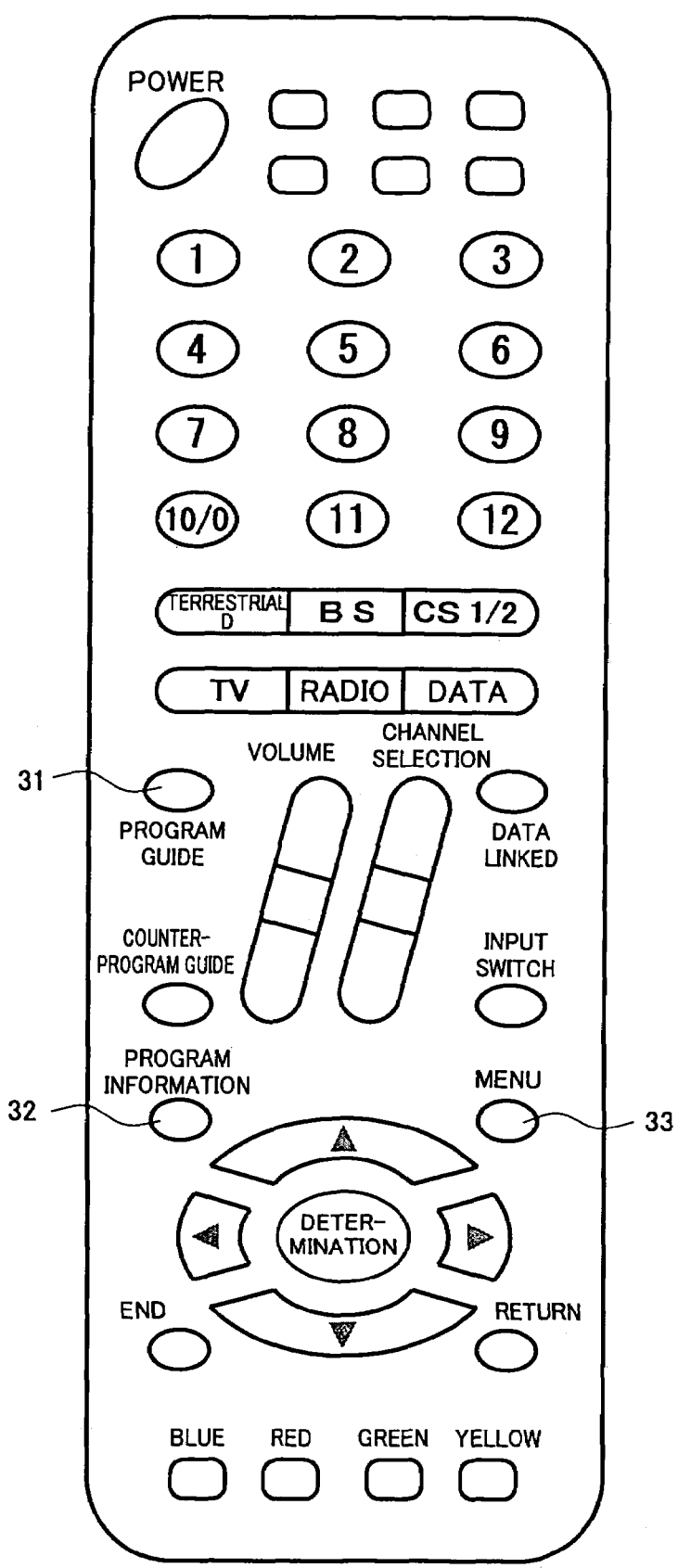
FIG. 7 is an external view of a remote controller in accordance with the first embodiment of the present invention.
Figure 8:
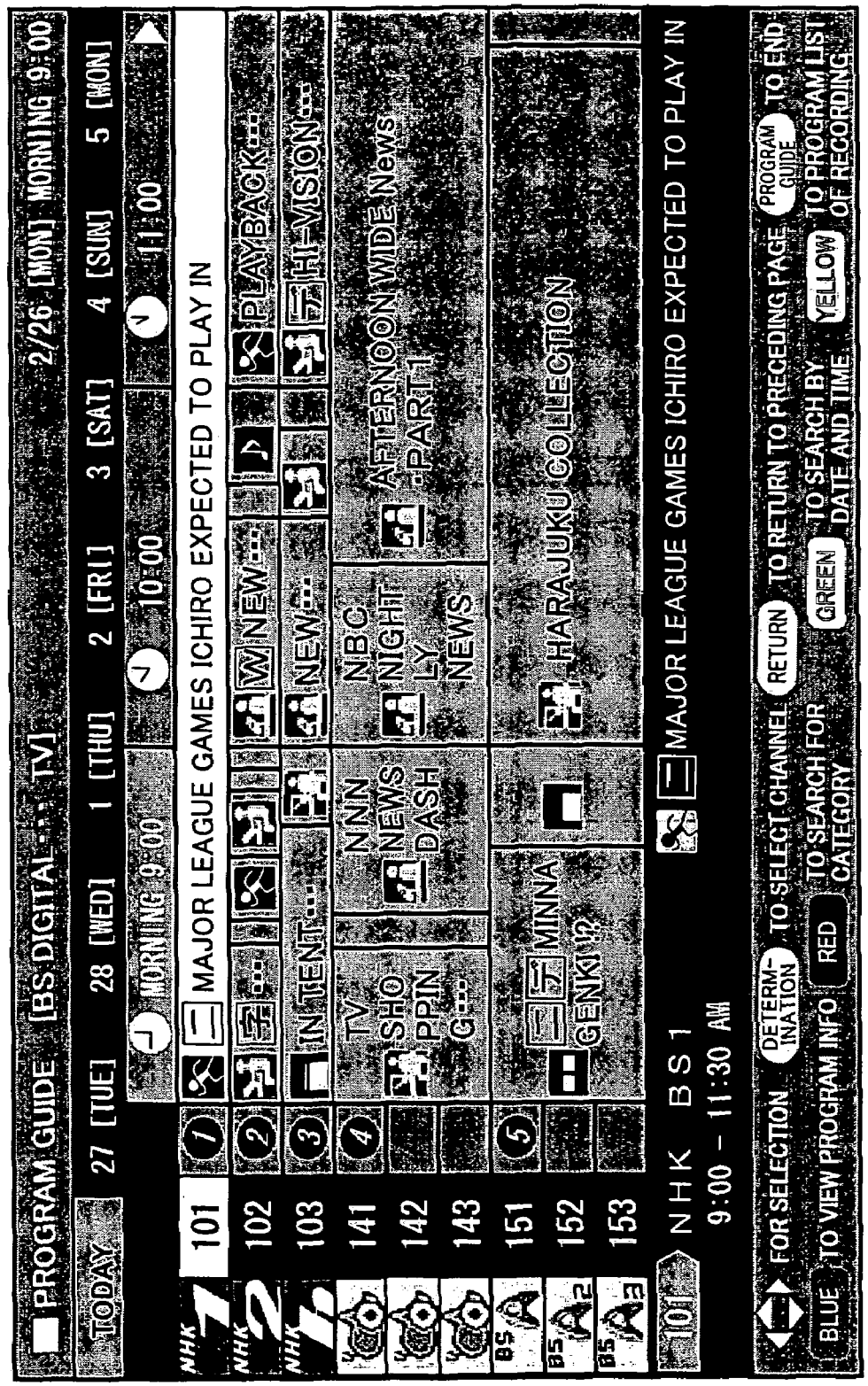
FIG. 8 illustrates a display example of an EPG display screen in accordance with the first embodiment of the present invention.
Figure 9:
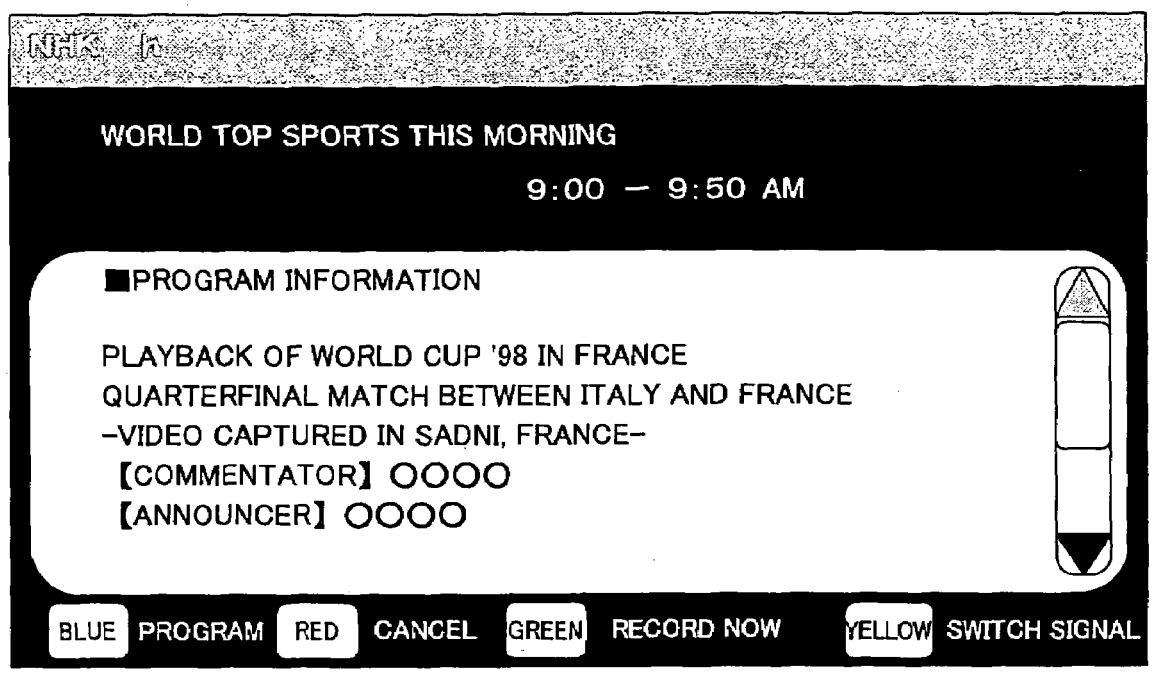
FIG. 9 illustrates a display example of a program information display screen in accordance with the first embodiment of the present invention.
Figure 10A:
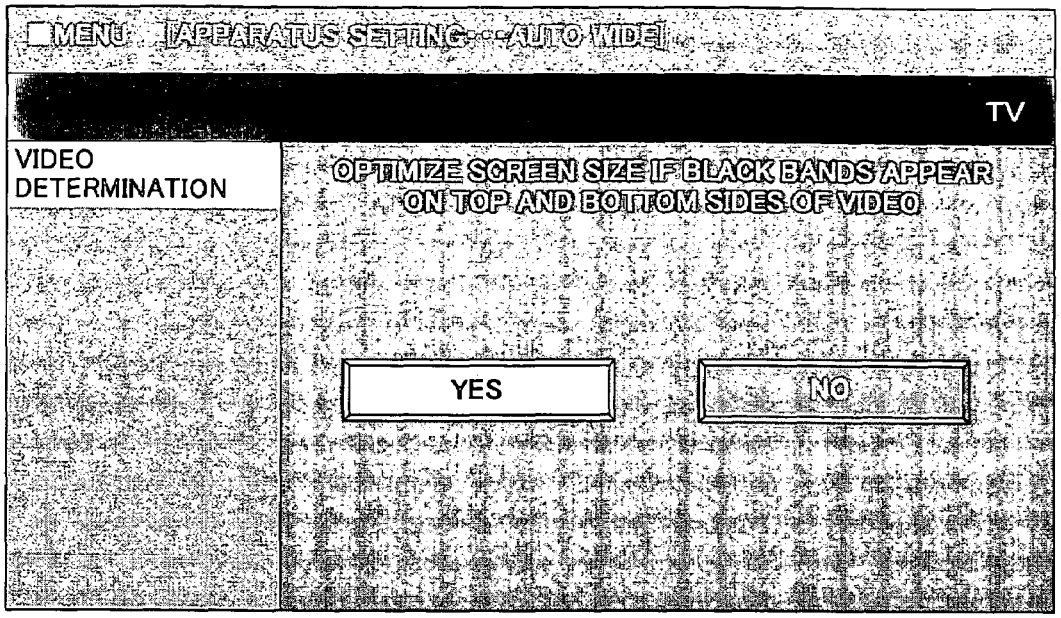
FIGS. 10A and 10B illustrate display examples of a setting menu display screen in accordance with the first embodiment of the present invention.
Figure 10B:
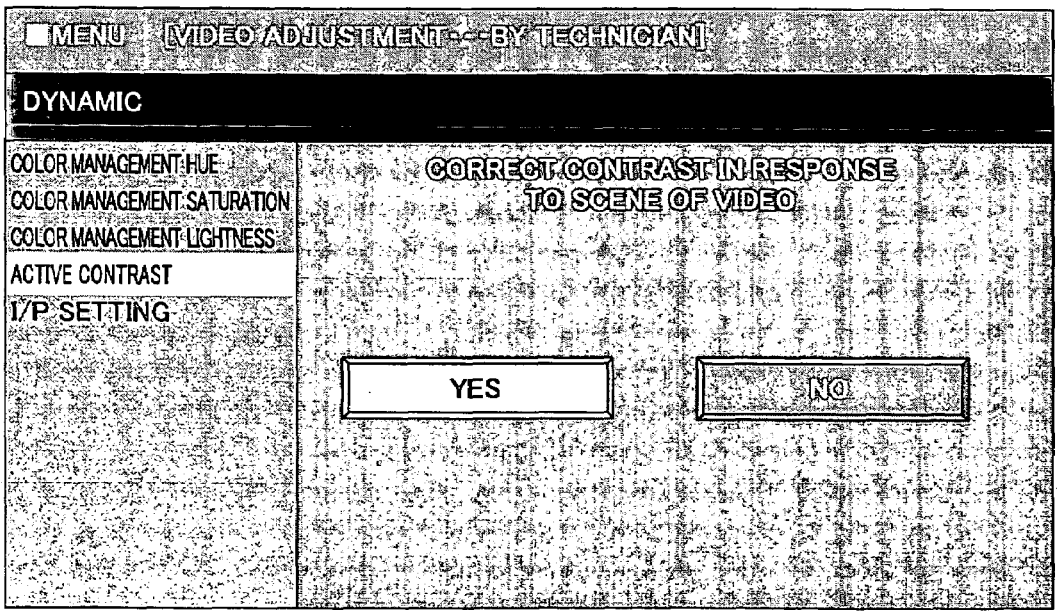

A liquid crystal display (LCD) television receiver as an image display device of a first embodiment of the present invention is described below with reference to FIGS. 6 through 14. FIG. 6 is a block diagram illustrating a schematic structure of the LCD television receiver of the first embodiment. FIG. 7 is an external view of a remote controller of the LCD television receiver of the first embodiment. FIG. 8 illustrates a display example of an EPG (electronic program guide) display screen of the LCD television receiver in accordance with the first embodiment. FIG. 9 illustrates a display example of a program information display screen of the LCD television receiver in accordance with the first embodiment. FIGS. 10A and 10B illustrate display examples of a setting menu screen of the LCD television receiver in accordance with the first embodiment.

Figure 12:
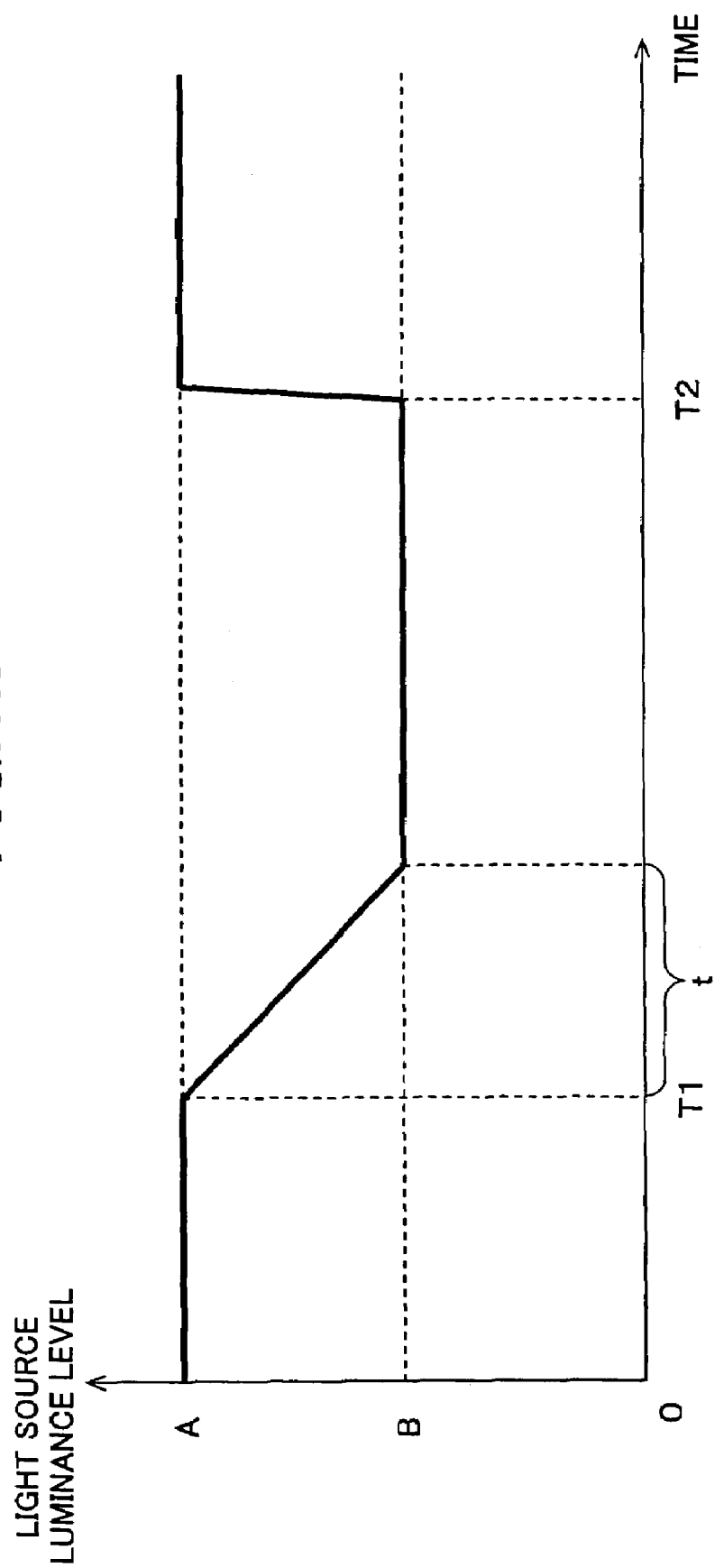
FIG. 12 illustrates the control operation of the LCD television receiver in accordance with the first embodiment of the present invention.
Figure 13:
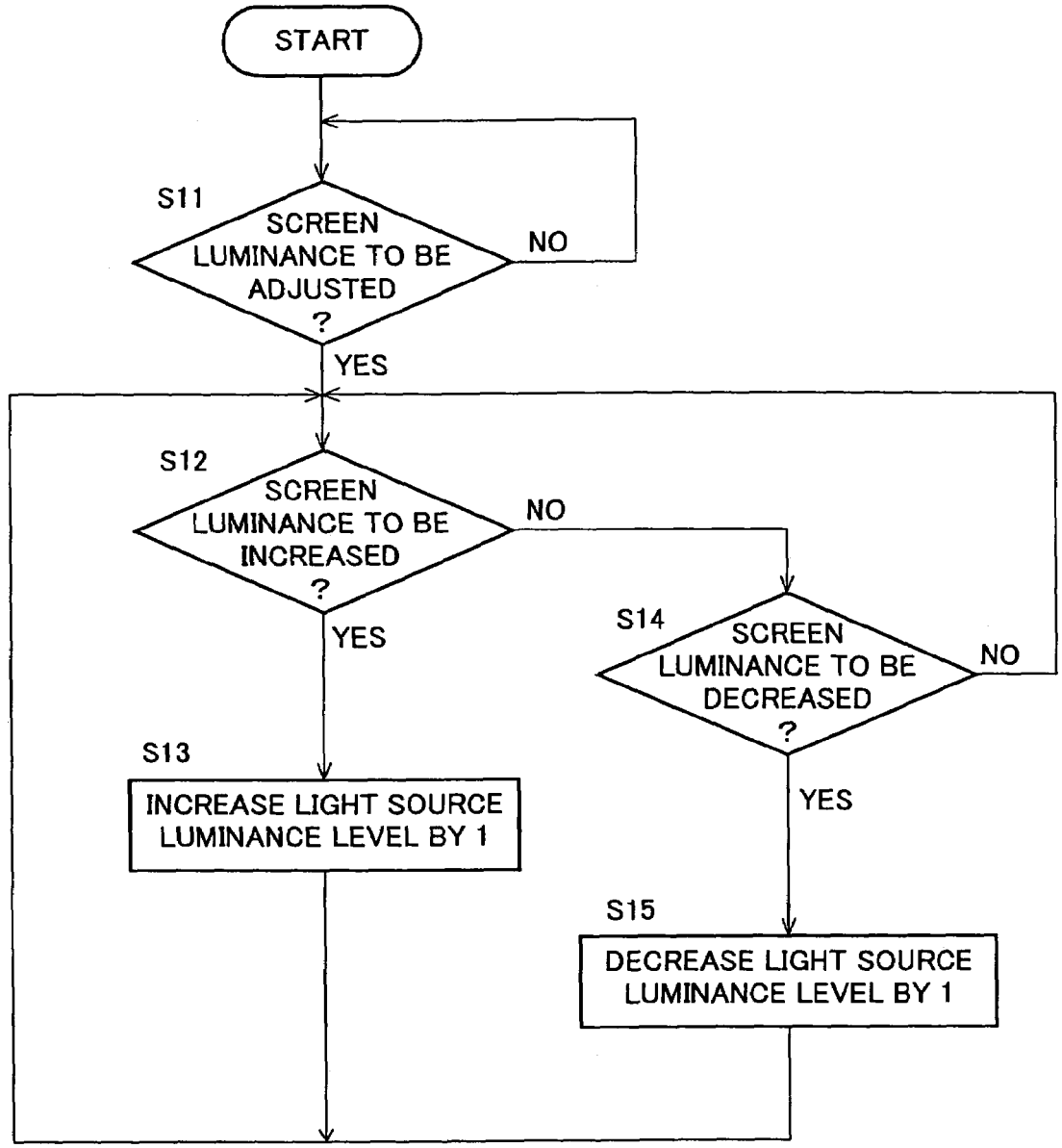
FIG. 13 is a flowchart illustrating the control operation of the LCD television receiver in accordance with the first embodiment of the present invention.

FIG. 11 is a flowchart illustrating control operation of the LCD television receiver in accordance with the first embodiment. FIG. 12 illustrates the control operation of the LCD television receiver in accordance with the first embodiment. FIG. 13 is a flowchart illustrating the control operation of the LCD television receiver in accordance with the first embodiment. FIG. 14 illustrates another control operation of the LCD television receiver in accordance with the first embodiment.

The LCD television receiver of the first embodiment comprises, as shown in FIG. 6, a tuner 11 for selecting a desired channel from a television broadcast wave received by an antenna, a decoder 12 for decoding a television signal selected by the tuner 11, an image processor 13 for performing a predetermined image process on a television signal decoded by the decoder 12, and a program information acquisition portion 14 for acquiring program information from the television signal decoded by the decoder 12.

The LCD television receiver further comprises a remote controller photosensitive portion 15 for receiving a command signal input by a user from a remote controller which will be described below with reference to FIG. 7, and a microcomputer 16 for detecting and analyzing the command signal received by the remote controller photosensitive portion 15, and outputting predetermined control signals to the tuner 11, the decoder 12, the image processor 13, etc. Based on the program information acquired by the program information acquisition portion 14, the microcomputer 16 controls the graphics generation portion 17, thereby outputting graphic data relating to the electronic program guide to a switching and synthesizing portion 18.

The graphics generation portion 17 generates not only the electronic program guide based on the program information acquired by the program information acquisition portion 14 but also graphic data for displaying a variety of setting menus in an OSD display under the control of the microcomputer 16.

The LCD television receiver further comprises the switching and synthesizing portion 18, an LCD driver 19, and a light source driver 21. The switching and synthesizing portion 18 switches between a television video signal output from the image processor 13 and the OSD display graphic data generated by the graphics generation portion 17, or synthesizes the television video signal and the OSD display graphic data, in response to a switch/synthesis control signal from the microcomputer 16. The LCD driver 19 drives and controls source lines and gate lines of an LCD panel 20 based on an RGB signal (image display signal) output from the switching and synthesizing portion 18. The light source driver 21, such as an inverter circuit, drives and controls the luminance of the backlight source 22 in response to a backlight control signal from the microcomputer 16.

The LCD television receiver of the first embodiment may be a directly under backlight type or a side-edge backlight type. The light source 22 may be a widely available cold cathode fluorescent lamp (CCFL) or a light-emitting diode (LED). The control method of luminance of the light source 22 is not limited to voltage (or current) control. The luminance intensity of the light source 22 may be controlled by not only controlling of the duty factor but controlling of a voltage or current.

The microcomputer 16 switches and outputs, as necessary, between the television video signal output from the image processor 13 and the graphic data generated by the graphics generation portion 17 as a video to be displayed on the LCD panel 20 in response to a user setting command. The microcomputer 16 also controls the luminance intensity of the light source 22 driven by the light source driver 21.

As shown in FIG. 7, the remote controller of the LCD television receiver of the first embodiment comprises a program guide button 31, a program information button 32 and a menu button 33. The program guide button 31 is used to display an electronic program guide (EPG) to search for a desired program and to program video recording or sound recording of a desired broadcast program. The program information button 32 is used to display, on the screen, a variety of information relating to the program selected in the EPG or currently viewed. The menu button 33 is used to display a setting menu screen for adjusting videos and sounds and setting a variety of functions.

When a user selects the program guide button 31 of the remote controller, a GUI screen of the EPG of FIG. 8, generated based on the program information acquired from received data, may be displayed on the LCD panel 20. The user operates up, down, right and left buttons, and a determination button to search for a desired program or to program recording of a video or sound while watching the GUI screen of the EPG. Since high screen luminance is not needed in this case, the luminance intensity of the backlight source 22 is lowered, leading to a low power consumption.

By selecting the program information button 32, the user can display, on the LCD panel 20, the GUI screen of the program information of FIG. 9 generated based on the program information acquired from the received data. The user can recognize the content of each program while watching the GUI screen of the program information. The user operates the up, down, left and right buttons, the determination button, and the color buttons on the remote controller to program recording of a video program or an audio program, to cancel the program recording, or to display further detailed information of the programs. Since high screen luminance is not needed in this case as well, the luminance intensity of the backlight source 22 is lowered to achieve power saving.

By selecting the menu button 33, the up, down, left and right buttons, the user can display, on the LCD panel 20, the GUI screen of the setting menu relating to predetermined items of FIG. 10A and FIG. 10B. The user thus operates the up, down, left and right buttons and a determination button on the remote controller to adjust the video and sound and set a variety of functions while watching the GUI screen of the setting menu. Since high screen luminance is not needed in this case as well, the luminance intensity of the light source 22 is lowered to achieve power saving.

In response to a user setting instruction, the LCD television receiver of the first embodiment thus switches between a mode of displaying an ordinary television video and a mode of displaying a graphic user interface video, such as an electronic program guide and a variety of setting menus. In response to the mode switching, the microcomputer 16 controls the light source driver 21, thereby variable controlling a screen luminance, namely, luminance intensity of the light source 22.

Control operation of controlling the screen luminance on the LCD television receiver of the first embodiment is described below with reference to a flowchart of FIG. 11. The user operates the remote controller to issue a display screen switching instruction (function switching instruction) (step S1). The microcomputer 16 determines which of the mode of displaying an ordinary television broadcast program video and a graphic user interface (GUI) screen video is selected.

More specifically, the microcomputer 16 determines whether the program guide button 31 is selected to display the EPG (step S2), whether the program information button 32 is selected to display the program information (step S3) and then whether the menu button 33 is selected to display a variety of setting menus (step S4).

If it is determined that all determination results of steps S2 to S4 are non-affirmative, the microcomputer 16 determines that a mode of displaying an ordinary television broadcast program video is selected. In step S5, the microcomputer 16 issues a control signal to the light source driver 21 so that the luminance intensity level of the backlight source 22 becomes a predetermined value "A" (for example, 10000 cd/m$^2$).

If it is determined in the step S2 that the displaying of the EPG is instructed, or if it is determined in the step S3 that the displaying of the program information is instructed, or if it is determined in the step S4 that the displaying of the variety of setting menus is instructed, the microcomputer 16 determines that the mode of displaying the GUI screen is selected. In step S6, the microcomputer 16 issues a control signal to the light source driver 21 so that the luminance intensity level of the backlight source 22 becomes a predetermined value "B" ("B" is smaller than "A", and 5000 cd/m$^2$, for example).

As described above, in response to a user screen switching instruction (function selecting setting), the microcomputer 16 switches between the mode of displaying the television video and the mode of displaying the GUI video. In response to the mode switching operation, the microcomputer 16 controls the luminance intensity of the light source 22 to achieve the appropriate screen luminance. When the GUI screen, such as the electronic program guide (EPG and program information) and the variety of setting menus, is displayed, the microcomputer 16 lowers the screen luminance than when the ordinary television video is displayed. In this way, the user is relieved from eye fatigue, and the LCD television receiver consumes less power.

If the screen luminance is sharply changed at the moment the display screen is switched, in particular, if the screen luminance sharply drops at the moment the LCD television receiver switches from the mode of displaying the television video to the mode of displaying the GUI video, the user feels it uncomfortable.

In accordance with the first embodiment, as shown in FIG. 12, a sufficient time t is permitted before the screen luminance level reaches B from time T1 when mode switching is instructed to switch from the mode of displaying the television broadcast program video to the mode of displaying the GUI screen video. In this way, a rate of change of screen luminance is slowed (with a large time constant to allow the screen luminance to slowly vary) to alleviate the uncomfortable luminance change for a user.

The user feels less uncomfortable an increase in the screen luminance that occurs at the moment of switching from the mode of displaying the GUI video to the mode of displaying the television broadcast program video. A short time is permitted before the screen luminance level reaches the level A from time T2 at the moment of switching from the mode of displaying the GUI screen video to the mode of displaying the television broadcast program video. Preferably, a high-luminance and high-contrast television video is thus immediately displayed.

In accordance with the first embodiment, a manual adjustment control on the screen luminance by the user may be performed in addition to the automatic control responsive to the display screen mode switching. The user manual adjustment control is described below with reference to a flowchart of FIG. 13. In step S11, a user luminance adjustment command is detected when the user selects a luminance adjustment key of the remote controller (not shown). Then, a luminance adjustment setting OSD (on screen display) is displayed on one edge portion of the screen. The user selects the up key or the down key to instruct an increase or a decrease in the screen luminance while watching the luminance adjustment setting OSD.

If a luminance increase is instructed with the up key pressed on the remote controller (step S12), the microcomputer 16 issues a control signal to the light source driver 21 (step S13) so that the backlight source 22 reaches a luminance intensity level one notch higher than the preceding level. If a luminance decrease is instructed with the down key pressed on the remote controller (step S14), the microcomputer 16 issues a control signal to the light source driver 21 (step S15) so that the backlight source 22 reaches a luminance intensity level one notch lower than the preceding level.

Taking into consideration the operational environment and the content of a display video, the user can optionally make manual adjustments to the screen luminance that has automatically been set in response to each of the screen display modes. With this arrangement, the merchantability is achieved.

An illuminance sensor may be arranged to detect ambient illuminance surrounding the LCD television receiver. The screen luminance may be determined based on the video display mode and the detection results of the illuminance sensor. As shown in FIG. 14, during the mode of displaying the television broadcast program video, the luminance intensity level of the light source 22 is $A_1$ if the ambient illuminance is high. The luminance intensity level of the light source 22 is $A_2$ if the ambient illuminance is within a standard range. The luminance intensity level of the light source 22 is $A_3$ if the ambient illuminance is low. Then, the relationship of $A_1 > A_2 > A_3$ holds. During the mode of displaying the GUI screen video, the luminance intensity level of the light source 22 is $B_1$ if the ambient illuminance is high. The luminance intensity level of the light source 22 is $B_2$ if the ambient illuminance is within the standard range. The luminance intensity level of the light source 22 is $B_3$ if the ambient illuminance is low. Then, the relationship of $B_1 > B_2 > B_3$ holds.

The screen luminance is automatically controlled to a level optimum for each screen display mode taking into consideration the illuminance of the viewing environment. Thus, the merchantability is achieved.

In accordance with the first embodiment of the present invention, the GUI video includes an EPG screen, a program information screen, and a menu screen. However, the present invention is not limited to these screens. The GUI video may be any display screen of a variety of graphic data generated by each of the microcomputer 16 and the graphics generation portion 17.

In accordance with the first embodiment of the present invention, the function switching instruction (screen switching instruction) is issued by a one-touch operation on the remote controller by the user. Alternatively, the user may give the function switching instruction by operating a control member (not shown) arranged on the device body of the LCD television receiver.

When two screens of the GUI video and the television video are displayed in a picture-in-picture fashion with inset video or a picture-by-picture fashion, the luminance intensity of the backlight source can be controlled in response to the video type displayed on a larger area of the screen. For example, when an inset television video is displayed within the GUI video with the screen area of the GUI video larger than the inset television video area, the backlight source is adjusted to an luminance intensity level "B".

If the backlight source which can be adjusted in luminance intensity in response to the screen area. For example, the luminance intensity of the backlight source corresponding to the screen area displaying the television video may be set to be high, and the luminance intensity of the backlight source corresponding to another screen area displaying the GUI video may be set to be low in the other screen area displaying the GUI video. For example, if the two screens are shown with the GUI video displayed on the left-hand screen and the television video displayed on the right-hand screen, the luminance level "B" of the backlight source is set for the left-hand screen while the luminance level "A" of the backlight source is set for the right-hand screen. Such a control operation is easily performed using a directly under type LED backlight.

In accordance with the first embodiment, the luminance intensity of the backlight source 22 can be dynamically changed in response to image characteristics such as an average picture level (APL) of each video frame to achieve crispness and contrast in displaying a moving image. In this case, the maximum luminance intensity of the backlight source 22 is preferably set depending on whether a video to be displayed is a GUI video or a television video.

The direct-viewing type LCD has been discussed. The present invention is also applicable to a projection-type LCD. The present invention is also applicable to an image display device of the type that displays images with passive-type light modulating means and a backlight source, and other types of image display devices. A display panel other than the LCD panel may be used as the passive-type light modulating means.

It is contemplated that the level of a luminance signal input to the display panel is controlled in video signal processing by a luminance adjustment circuit in response to mode switching between the mode of displaying the television video and the mode of displaying the GUI video. Although this arrangement allows an image to be displayed at a screen luminance appropriate and comfortable for the viewer, no significant power saving effect is expected.

In accordance with the first embodiment of the present invention, the luminance intensity of the backlight source is controlled during each of the screen display modes. The LCD television receiver continuously displays the videos not only at a screen luminance appropriate and comfortable for the viewer but also in a power-saving manner.

The first embodiment of the present invention has been discussed in connection with the television receiver with an internal television broadcast receiving means. The present invention is not limited to the above television receiver. The present invention is applicable to a variety of image display devices including a personal computer (PC) receiving and displaying a television video, and a mobile communication terminal.

Second Embodiment

Figure 15:
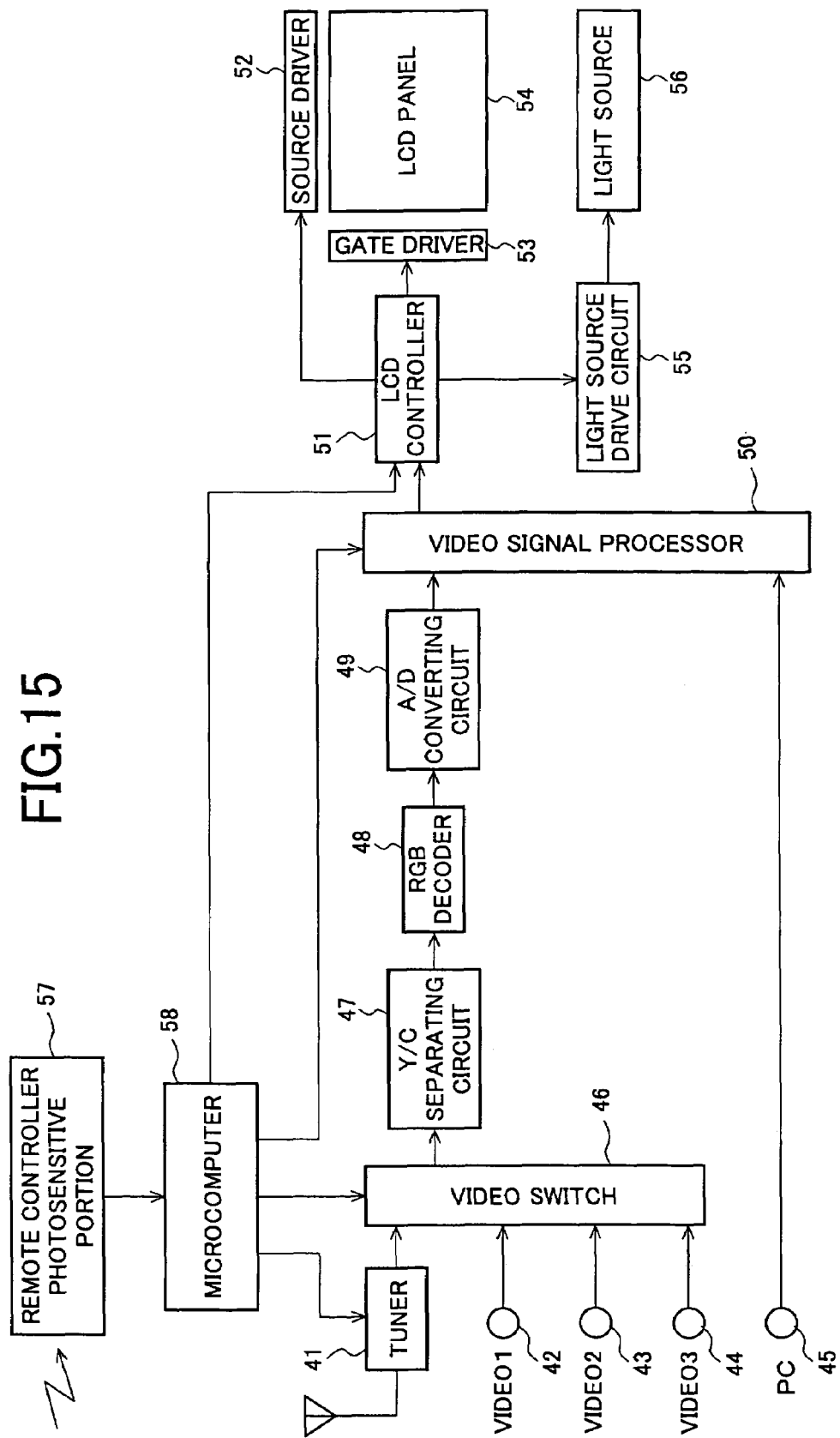
FIG. 15 is a block diagram illustrating a schematic structure of an LCD television receiver in accordance with a second embodiment of the present invention.
Figure 16:
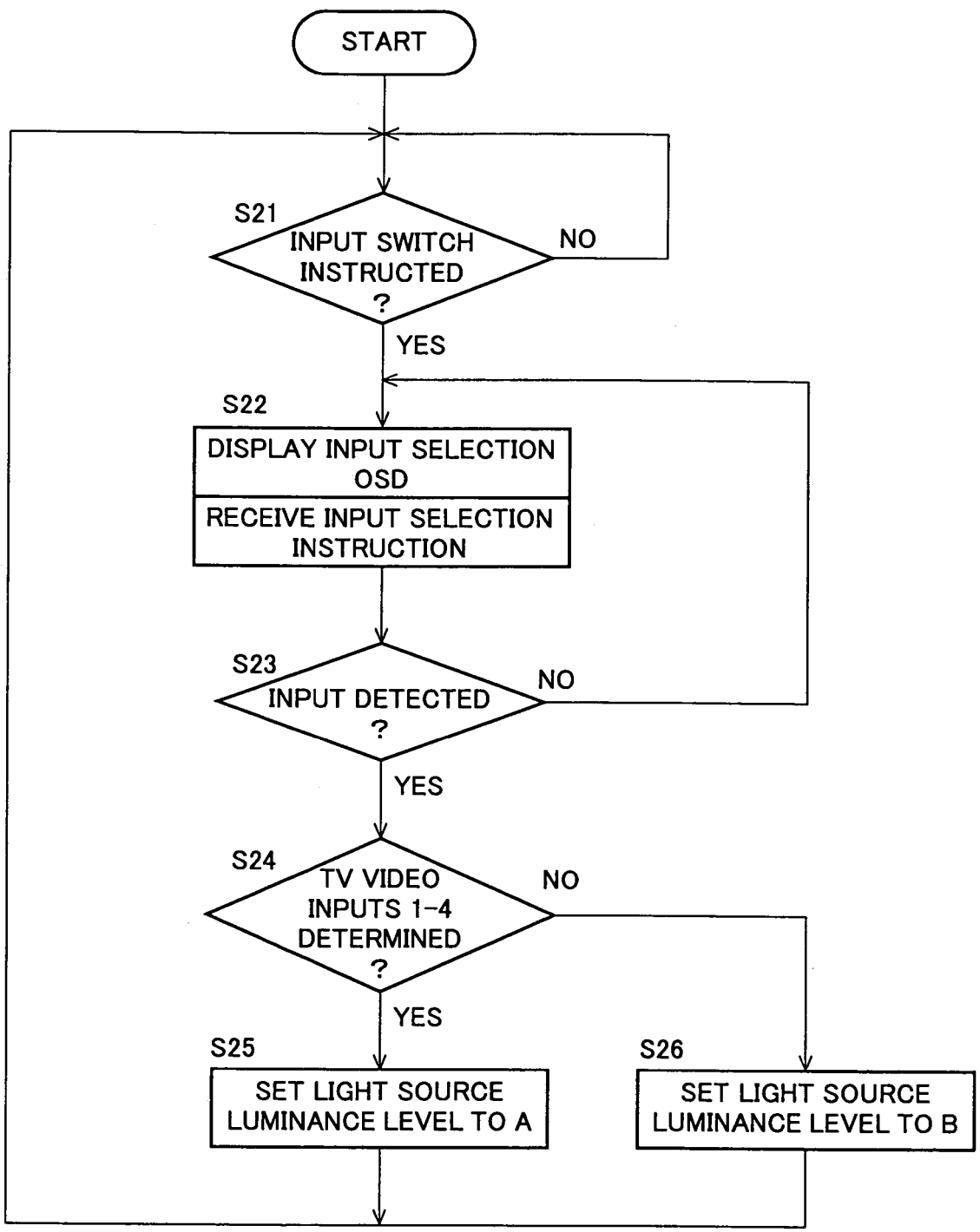
FIG. 16 is a flowchart illustrating control operation of the LCD television receiver in accordance with the second embodiment of the present invention.
Figure 17:
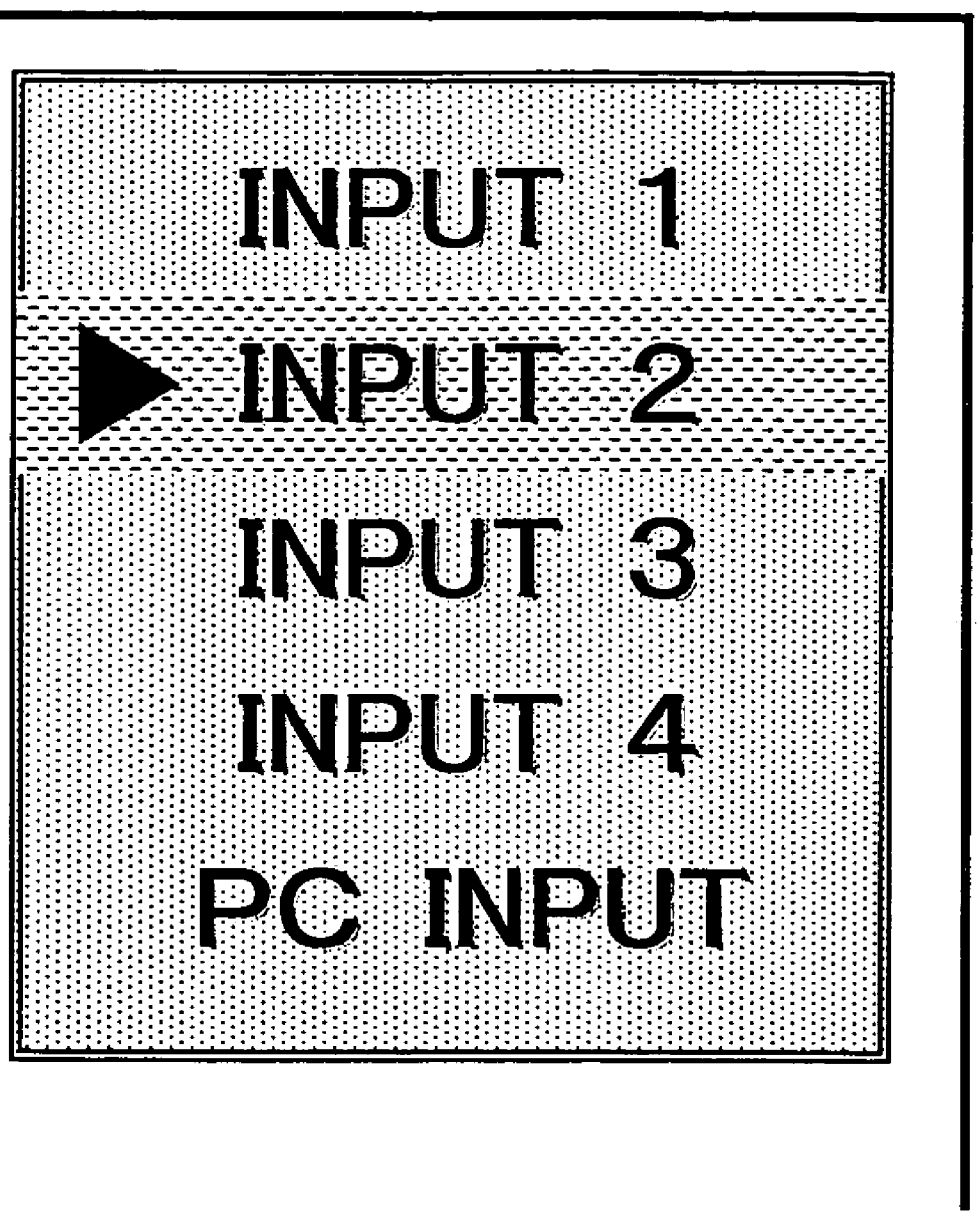
FIG. 17 illustrates an OSD display screen of an input switch setting menu in accordance with the second embodiment of the present invention.

An LCD television receiver external connectable to a PC, as a second embodiment of the present invention, is described below with reference to FIGS. 15 through 22. FIG. 15 is a block diagram illustrating a schematic structure of the LCD television receiver in accordance with the second embodiment of the present invention. FIG. 16 is a flowchart illustrating the control operation of the LCD television receiver in accordance with the second embodiment. FIG. 17 illustrates an OSD display screen of an input switch setting menu of the LCD television receiver in accordance with the second embodiment.

Figure 18:
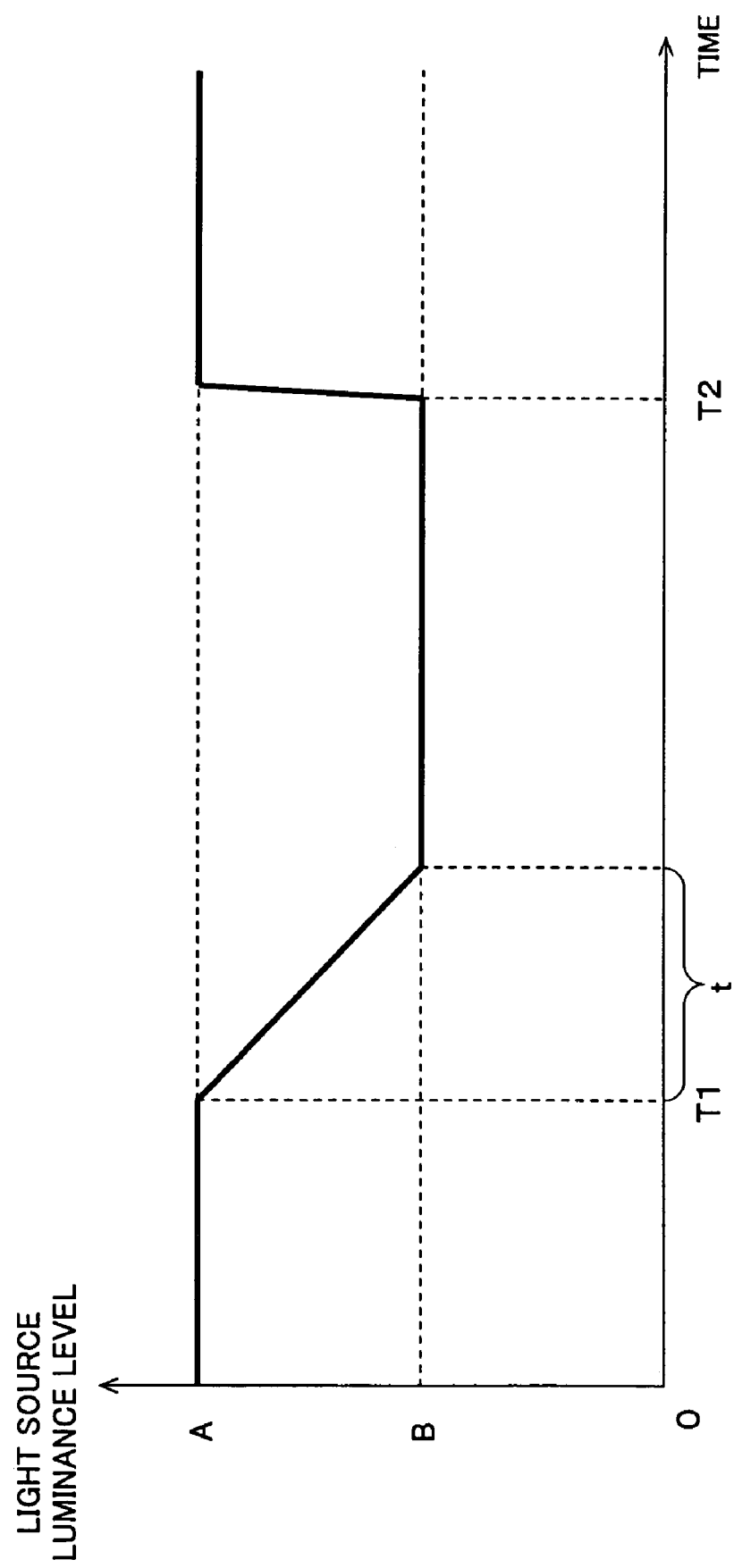
FIG. 18 illustrates the control operation of the LCD television receiver in accordance with the second embodiment of the present invention.
Figure 19:
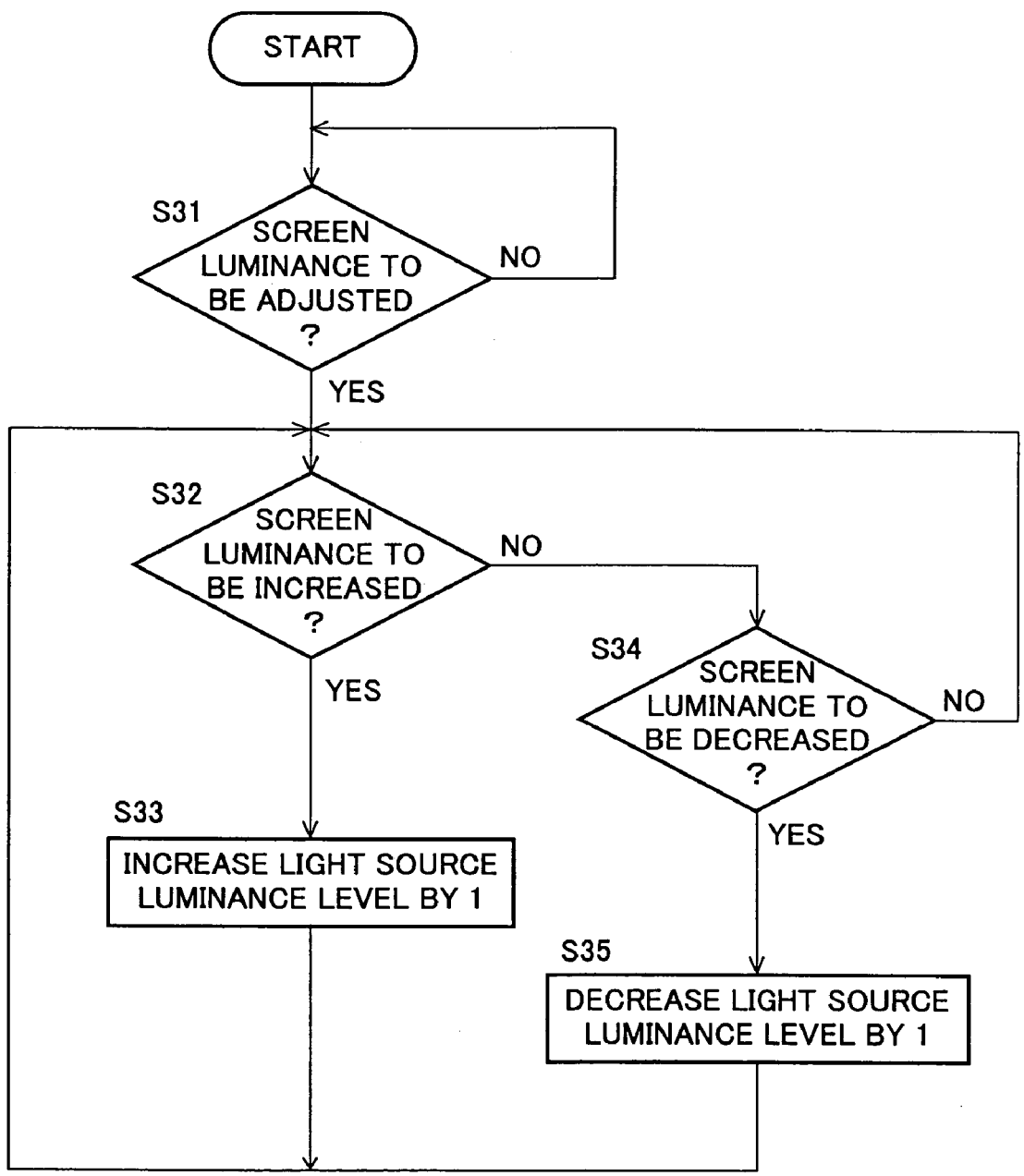
FIG. 19 is a flowchart illustrating the control operation of the LCD television receiver in accordance with the second embodiment of the present invention.
Figure 21:
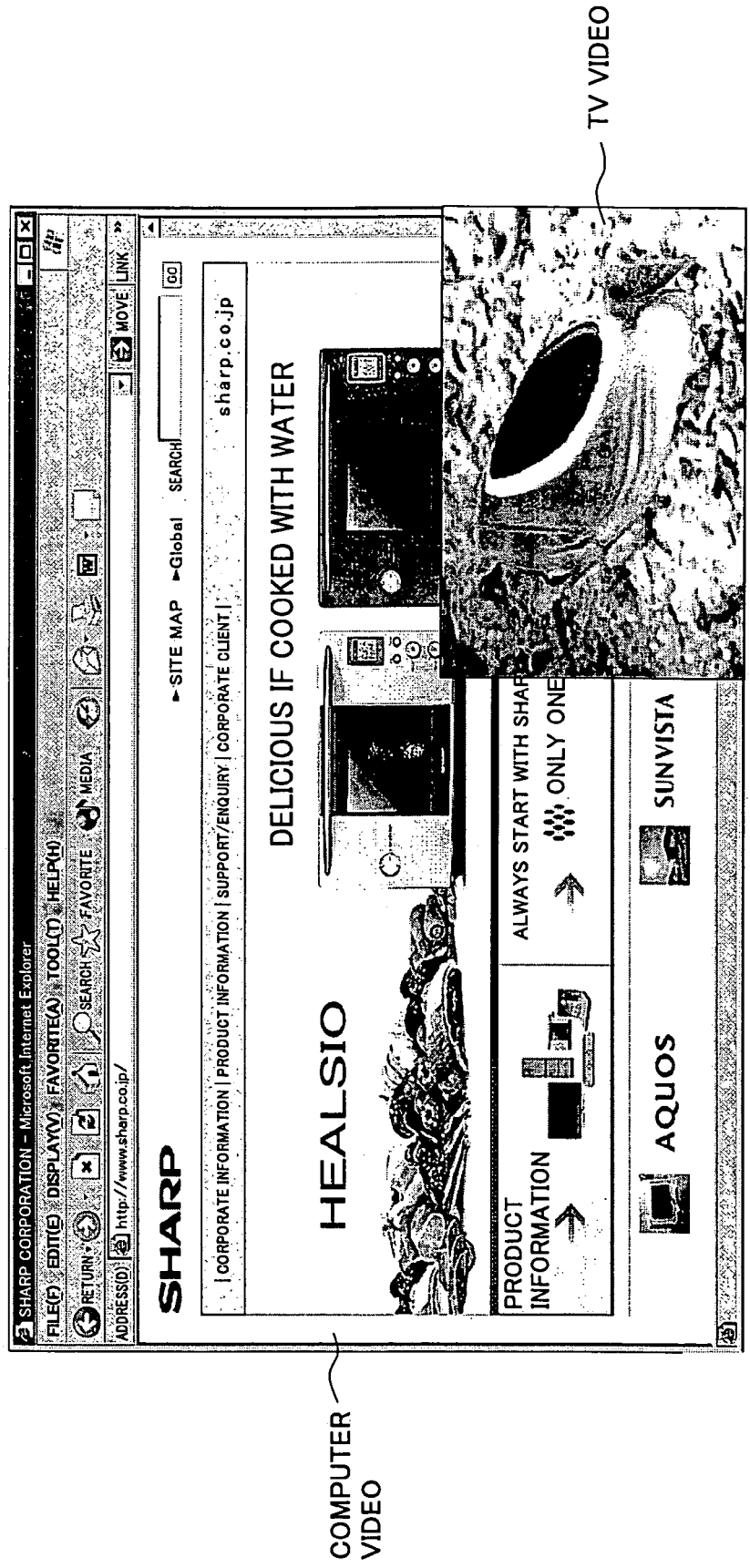
FIG. 21 illustrates a display example of a multi-screen (picture in picture) displaying a television video and a computer video.
Figure 22:
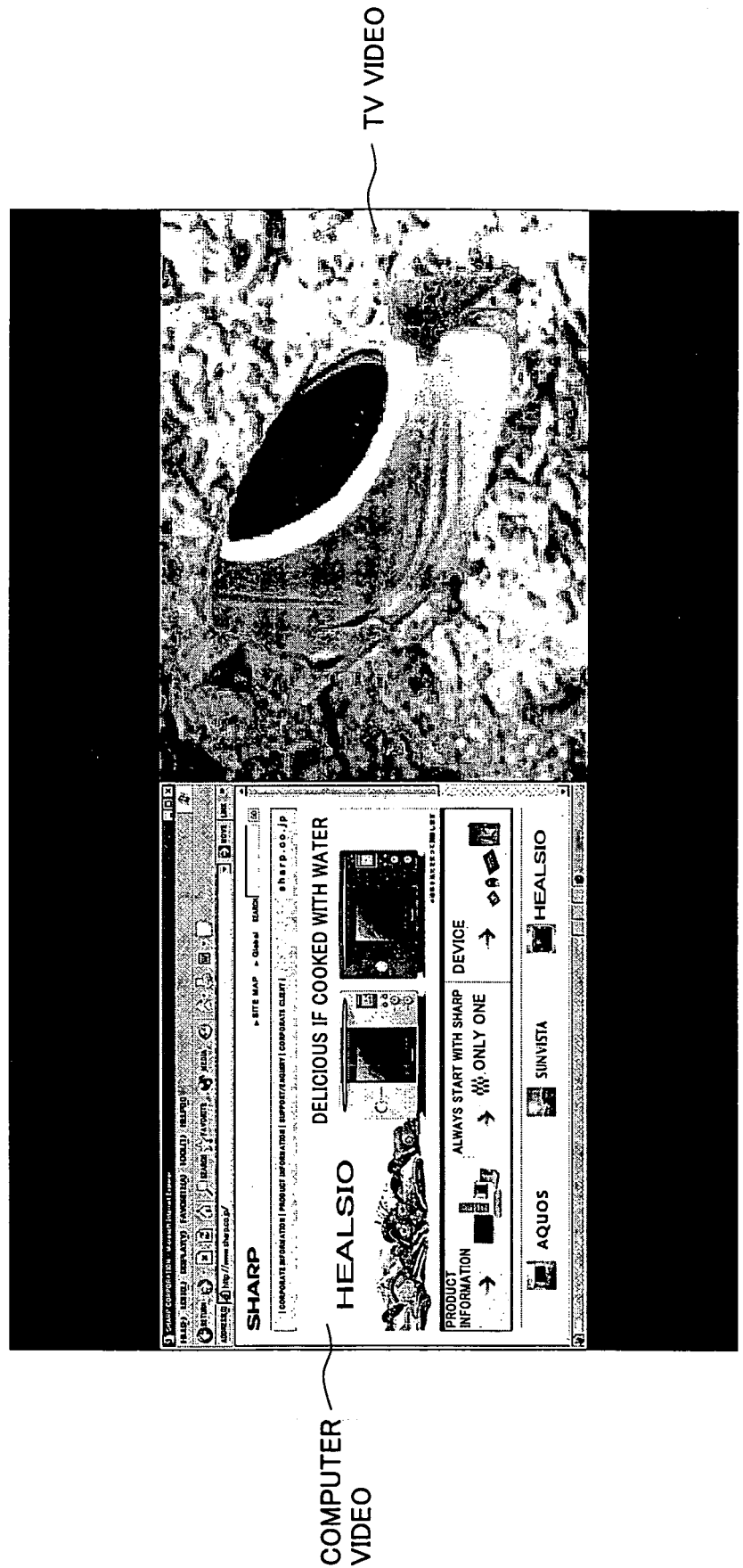
FIG. 22 illustrates a display example of the multi-screen (picture by picture) displaying the television video and the computer video.

FIG. 18 illustrates the control operation of the LCD television receiver of the second embodiment. FIG. 19 is a flowchart illustrating the control operation of the LCD television receiver of the second embodiment. FIG. 20 illustrates another control operation of the LCD television receiver in accordance with the second embodiment. FIG. 21 illustrates a display screen example of a multi-screen (picture in picture) displaying a television video and a computer video. FIG. 22 illustrates a display screen example of the multi-screen (picture by picture) displaying the television video and the computer video.

As shown in FIG. 15, the LCD television receiver of the second embodiment comprises a tuner 41 for selecting a desired channel from a television broadcast wave received by an antenna, video input terminals 42 to 44 for inputting video signals from external audio-visual (AV) devices, a PC input terminal 45 (such as D-Sub terminal, digital visual interface (DVI) terminal or the like) for receiving a computer video signal from an external PC, and a video switch 46 for switching between a received television signal selected by the tuner 41 and one of the video signals input via the input terminals 42 to 44 and outputting. The received television signal selected by the tuner 41 and the video signals input via the input terminals 42-44 correspond to the television video signals.

The LCD television receiver further comprises a Y/C separating circuit 47 for separating the television signal (composite signal) output from the video switch 46 into YC separate signals (luminance signal Y and a color signal C), an RGB decoder 48 for converting the luminance signal Y and the color signal C obtained by the Y/C separating circuit 47 into RGB primary color signals, and an A/D converting circuit 49 for analog-to-digital converting each of the RGB primary color signals.

The LCD television receiver further comprises a video signal processor 50. The video signal processor 50 performs, on each of the RGB signals (television video signal) output from the A/D converting circuit 49, and the RGB signals (computer video signal) input via the PC input terminal 45, desired video processing responsive to each input video signal format (for example, color space conversion process, interlace to progressive (IP) conversion process, scaling process, frame rate conversion (FRC) process, γ correction process, color correction process, and synchronization detection process), and selectively switches and outputs the video processed signals.

The LCD television receiver further comprises an LCD controller 51. The LCD controller 51 generates gradation data and a signal line control signal, each to be output to a source driver 52, based on the RGB signal (image display signal) output from the video signal processor 50. The LCD controller 51 also generates a scanning line control signal to be output to a gate driver 53 to perform image display control to an LCD panel 54. The LCD controller 51 also generates a backlight control signal to be output to a light source drive circuit 55, such as an inverter circuit, to perform light emission drive control to the backlight source 56.

The LCD television receiver of the second embodiment may be a directly under backlight type or a side-edge backlight type. The light source 56 may be a widely available cold cathode fluorescent lamp (CCFL) or a light-emitting diode (LED). The control method of luminance of the light source 56 is not limited to voltage or current control. The luminance intensity of the light source 56 may be controlled by not only controlling of the duty factor but controlling of a voltage or current.

The LCD television receiver further comprises a remote controller photosensitive portion 57 for receiving a command signal input to a remote controller (not shown) by a user, and a microcomputer 58 for detecting and analyzing the command signal received by the remote controller photosensitive portion 57, and issues predetermined control signals to the tuner 41, the video switch 46, the video signal processor 50, and the LCD controller 51.

In response to a user setting command, the microcomputer 58 controls program selection on the tuner 41, output selection of the video switch 46 between a received television signal and an external video signal, output switch of the video signal processor 50 between a television video signal and a computer video signal, and adjustment of luminance intensity of the backlight source by the LCD controller 51.

Based on a user setting command, the LCD television receiver of the second embodiment controls the video switch 46 and the video signal processor 50, thereby switching between the mode of displaying the television video and the mode of displaying the computer video. In response to the mode switching, the microcomputer 58 controls the LCD controller 51, thereby variable controlling the luminance intensity of the backlight source 56, namely, the screen luminance.

The control operation of the screen luminance of the LCD television receiver in accordance with the second embodiment is described below with reference to a flowchart of FIG. 16. An input switch command is detected in step S21 when the user selects an input switch key (not shown) on the remote controller. An input selection OSD (on screen display) shown in FIG. 17 is displayed on one corner of the screen and the LCD television receiver is now in a ready state to receive an input selection command from the user (step S22). In this state, the user operates one of up and down keys on the remote controller while watching the input selection OSD in order to select one of an input 1 (received television signal), an input 2 (external video signal 1), an input 3 (external video signal 2), an input 4 (external video signal 3), and a PC input (external PC signal). The user thus sets a video source to be displayed on the screen.

When an input selection determination command is detected in response to the selection of a determination key on the remote controller (step S23), the microcomputer 58 determines the input source selected at this moment (step S24). If the input selection determination command points to one of inputs 1 to 4, the microcomputer 58 issues control signals to the video switch 46 and the video signal processor 50 in response to the command. The microcomputer 58 also determines that the display mode of the television video has been selected, and issues a control signal to the LCD controller 51 so that the luminance intensity level of the backlight source 56 is set to a predetermined value "A" (for example, 10000 cd/m$^2$).

If it is determined in step S24 that the input source indicated by the input selection determination command is a PC input, the microcomputer 58 issues control signals to the video switch 46 and the video signal processor 50 in response to the command. The microcomputer 58 also determines that the display mode of the computer video has been selected, and issues a control signal to the LCD controller 51 in step S26 so that the luminance intensity level of the backlight source 56 is set to a predetermined value "B" ("B" is smaller than "A", and 5000 cd/m$^2$, for example).

In accordance with the second embodiment, in response to the input switch command from the user, the microcomputer 58 switches between the mode of displaying the television video and the mode of displaying the computer video. In response to the mode switching operation, the microcomputer 58 controls the luminance intensity of the light source 56 to an appropriate screen luminance. The screen luminance is set to be lower in displaying the computer video than in displaying the television video. The LCD television receiver not only displays an image causing no eye fatigue to the user, but also saves power.

If the screen luminance sharply drops at the moment the input is switched (the display mode is switched), in particular, at the moment the LCD television receiver switches from the mode of displaying the television video to the mode of displaying the computer video, the user can feel the change uncomfortable.

In accordance with the second embodiment, as shown in FIG. 18, a sufficient time t is permitted before the screen luminance level reaches B from time T1 when mode switching is instructed to switch from the mode of displaying the television video to the mode of displaying the computer video. In this way, a rate of change of screen luminance is slowed (with a large time constant to allow the screen luminance to slowly vary) to free the user from the uncomfortable screen luminance change.

The user typically feels less uncomfortable an increase in the screen luminance that occurs at the moment of switching from the mode of displaying the computer video to the mode of displaying the television video. A short time is permitted before the screen luminance level reaches the level A from time T2 when mode switching is instructed to switch from the mode of displaying the computer video to the mode of displaying the television video. Preferably, a high-luminance and high-contrast television video is thus immediately displayed.

In accordance with the second embodiment, a manual adjustment control by the user is performed on the screen luminance in addition to the automatic adjustment responsive to the video display mode. The user manual adjustment is described below with reference to a flowchart of FIG. 19. In step S31, a user luminance adjustment command is detected when the user selects a luminance adjustment key on the remote controller (not shown). A luminance adjustment setting OSD (on screen display) is displayed on one edge portion of the screen. In this case, the user selects the up key or the down key to instruct an increase or a decrease in the screen luminance while watching the luminance adjustment setting OSD.

If a luminance increase is instructed with the up key pressed on the remote controller (step S32), the microcomputer 58 issues a control signal to the LCD controller 51 (step S33) so that the luminance intensity level of the backlight source 56 reaches a level one notch higher than the preceding level. If a luminance decrease is instructed with the down key pressed on the remote controller (step S34), the microcomputer 58 issues a control signal to the LCD controller 51 (step S35) so that the luminance intensity level of the backlight source 56 reaches a level one notch lower than the preceding level.

Taking into consideration the operational environment and the content of a display video, the user can optionally make manual adjustments to the screen luminance that has automatically been set in response to each of the video display modes. With this arrangement, the merchantability is achieved.

An illuminance sensor may be arranged to detect ambient illuminance surrounding the LCD television receiver. The screen luminance may be determined based on the detection results of the illuminance sensor and the video display mode. As shown in FIG. 20, during the mode of displaying the television video, the luminance intensity level of the light source 56 is $A_1$ if the ambient illuminance is high. The luminance intensity level of the light source 56 is $A_2$ if the ambient illuminance is within a standard range. The luminance intensity level of the light source 56 is $A_3$ if the ambient illuminance is low. Then, the relationship of $A_1>A_2>A_3$ holds. During the mode of displaying the computer video, the luminance intensity level of the light source 56 is $B_1$ if the ambient illuminance is high. The luminance intensity level of the light source 56 is $B_2$ if the ambient illuminance is within the standard range. The luminance intensity level of the light source 56 is $B_3$ if the ambient illuminance is low. Then, the relationship of $B_1>B_2>B_3$ holds.

The screen luminance can be thus automatically controlled to a level optimum for each video display mode taking into consideration the ambient illuminance. With this arrangement, the merchantability is achieved.

In accordance with the second embodiment of the present invention, the computer video is the PC video input from the connected external PC. Alternatively, the computer video includes any of hyper text markup language (HTML) data over the Internet connected to the image display device via communication means such as a modem, a browser screen of text data, a browser screen of electronic mails, a browser screen of electronic book data composed of text information and image information, read from a memory card via a memory card slot, and a game video input from a game playing machine.

When an Internet browser screen, an electronic mail browser screen, or an electronic book browser screen is displayed in response to an input switch setting or a function switch setting by the user, the luminance intensity of the backlight source is preferably set to be lower than the luminance intensity of the backlight source for displaying the television video.

In accordance with the second embodiment of the present invention, the LCD television receiver switches the mode of displaying the television video and the mode of displaying the computer video in response to the input switch setting by the user. Alternatively, the display mode may be automatically switched in response to the input status of the input video signal (for example, the presence or absence of the input video signal). The input switch setting is input on the remote controller by the user. Alternatively, the user may give the input switching instruction by operating a control member (not shown) arranged on the device body of the LCD television receiver.

When the computer video and the television video are displayed in a picture-in-picture fashion with an inset as shown in FIG. 21, or in a picture-by-picture fashion as shown in FIG. 22, the luminance intensity of the backlight source is preferably controlled in response to the video type displayed on a larger screen area. For example, when the television video is an inset video placed within the computer video as shown in FIG. 21, the screen area of the computer video is larger. Thus, the backlight source is preferably adjusted to an luminance intensity level of B.

If the backlight source which can be adjusted in luminance intensity in response to the screen area is used, the luminance intensity of the backlight source for the screen area displaying the television video may be set to be high while the luminance intensity of the backlight source for the other screen area displaying the computer video may be set to be low. If the two screens are displayed with the computer video displayed on the left-hand screen and the television video displayed on the right-hand screen as shown in FIG. 22, the luminance level "B" is preferably set for the left-hand screen area while the luminance level "A" is preferably set for the right-hand screen area. Such a control operation is easily performed using a directly under type LED backlight source.

In accordance with the second embodiment of the present invention, the luminance intensity of the backlight source 56 can be dynamically variable controlled in response to video characteristics such as an average picture level (APL) of each video frame to achieve crispness and contrast in displaying a moving image. In this case, the maximum luminance intensity of the backlight source 56 can be set depending on whether a video to be displayed is a computer video or a television video.

In accordance with the second embodiment of the present invention, the direct-viewing type LCD has been discussed. The present invention is also applicable to a projection-type LCD. The present invention is further applicable to an image display device of the type that displays images with passive-type light modulating means and a backlight source. A display panel other than the LCD panel may be used as the passive-type light modulating means.

The second embodiment of the present invention has been discussed in connection with the LCD television receiver which can display the computer video signal from external connected personal computer (PC) by input switching. The present invention is not limited to such LCD television receiver. The present invention is applicable to a diversity of image display devices including a television receiver having a personal computer (PC) function, a personal computer (PC) with an internal television broadcast receiving means, and a mobile communication terminal.

Third Embodiment

Figure 1:
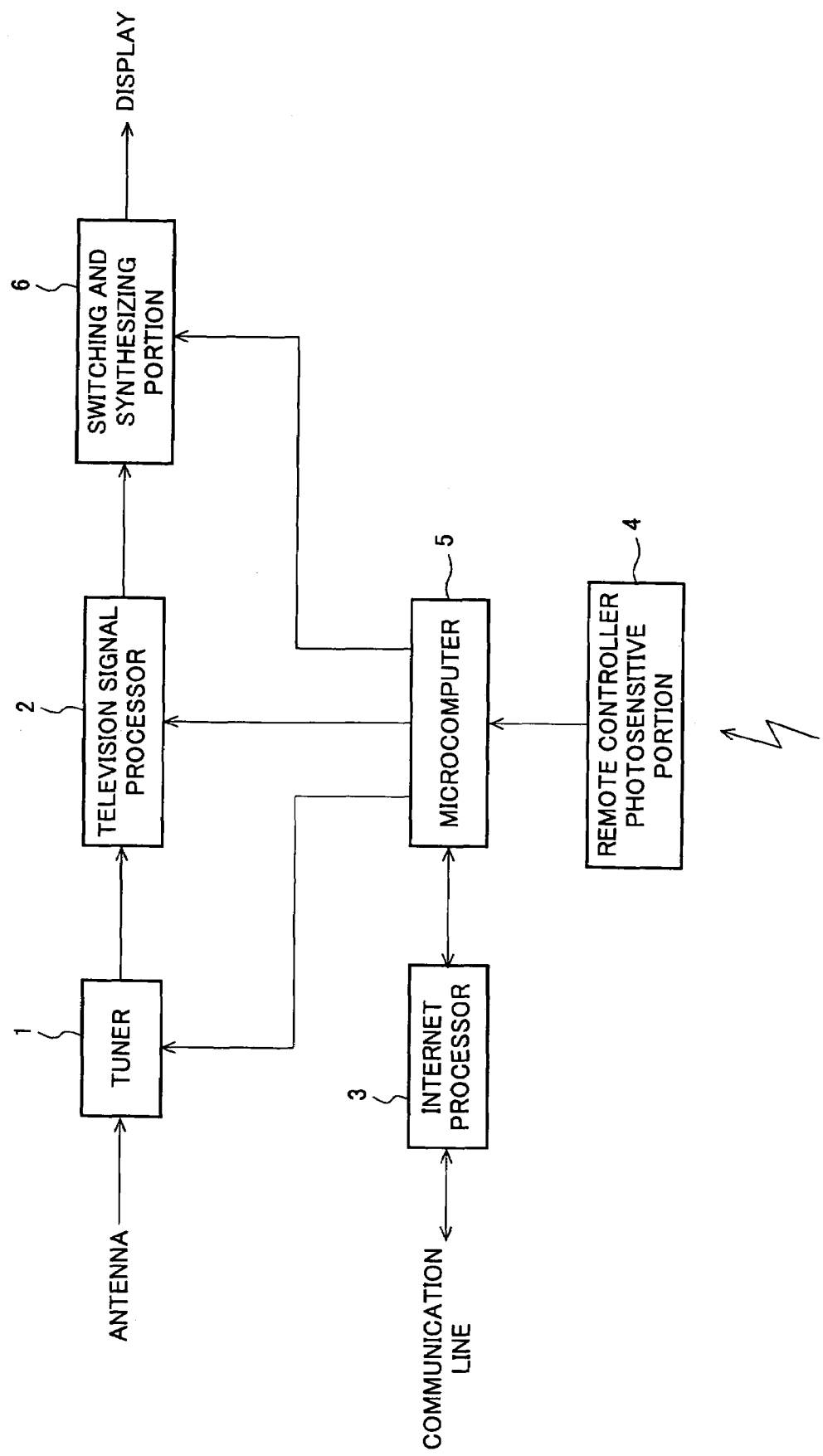
FIG. 1 is a block diagram illustrating a schematic structure of a conventional television receiver.
Figure 2:
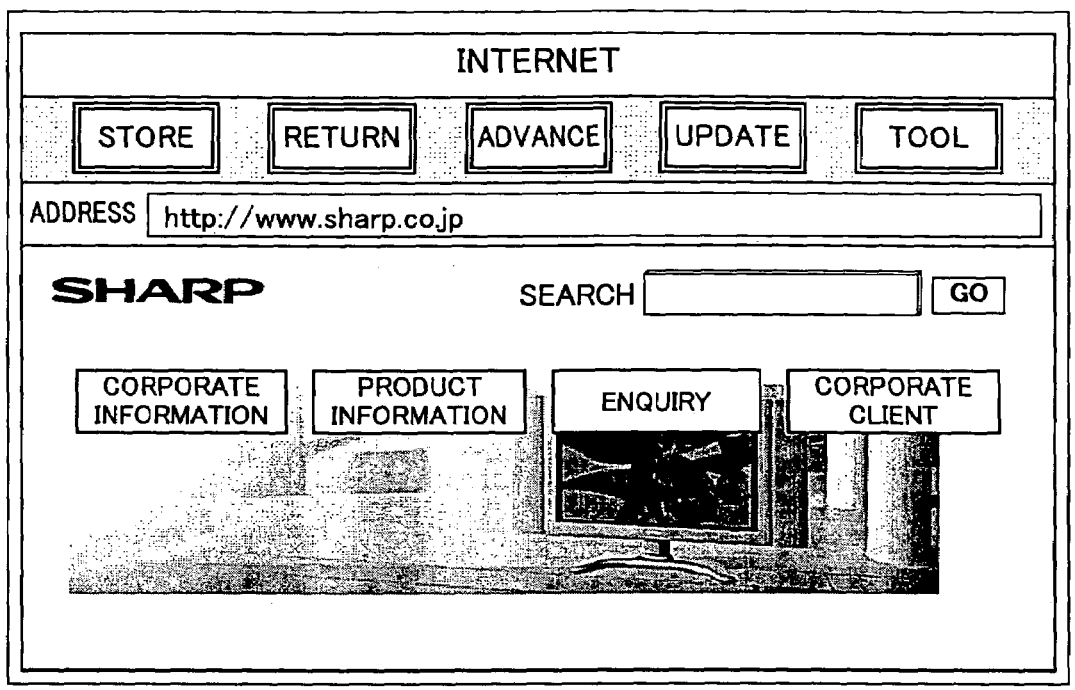
FIG. 2 illustrates a display example of an Internet browser screen.
Figure 3:
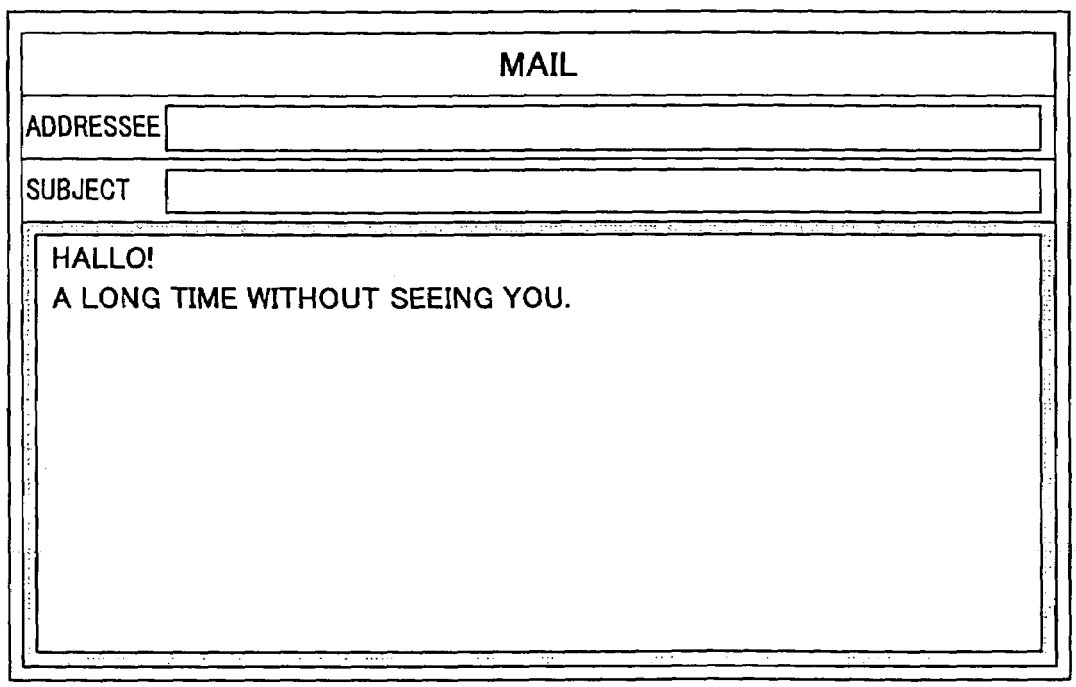
FIG. 3 illustrates a display example of an electronic mail browser screen.
Figure 4:
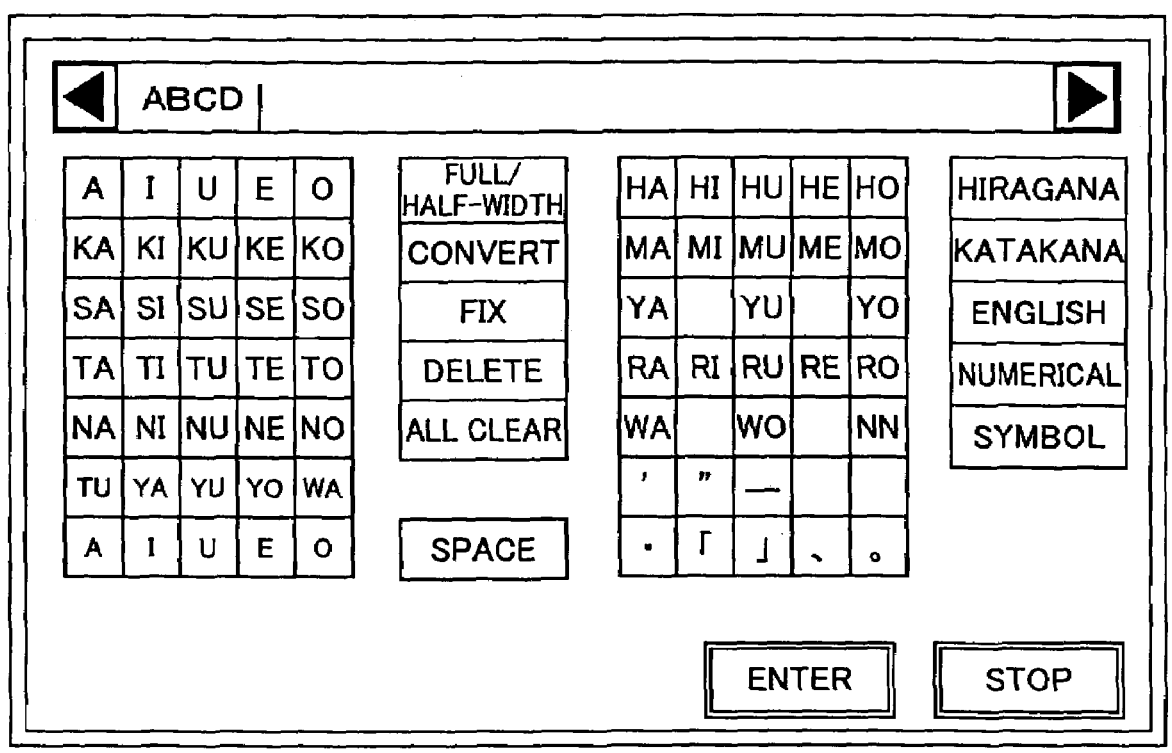
FIG. 4 illustrates a display example of a software keyboard screen.
Figure 5A:
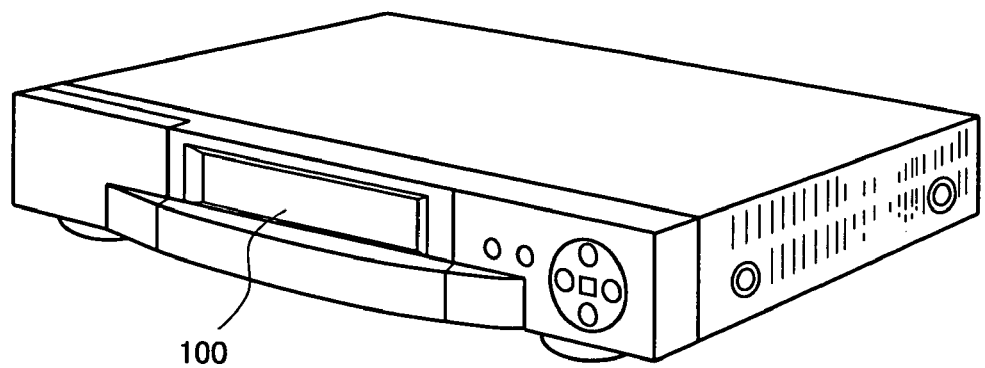
FIG. 5A is an external view of a conventional digital broadcast receiver.
Figure 5B:
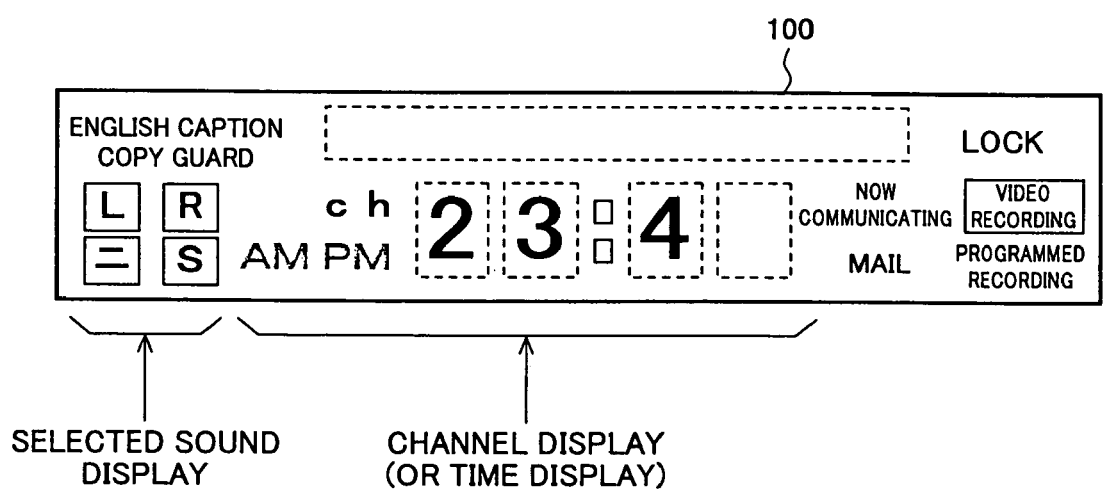
FIG. 5B is a partial enlarged view of the conventional digital broadcast receiver.
Figure 23:
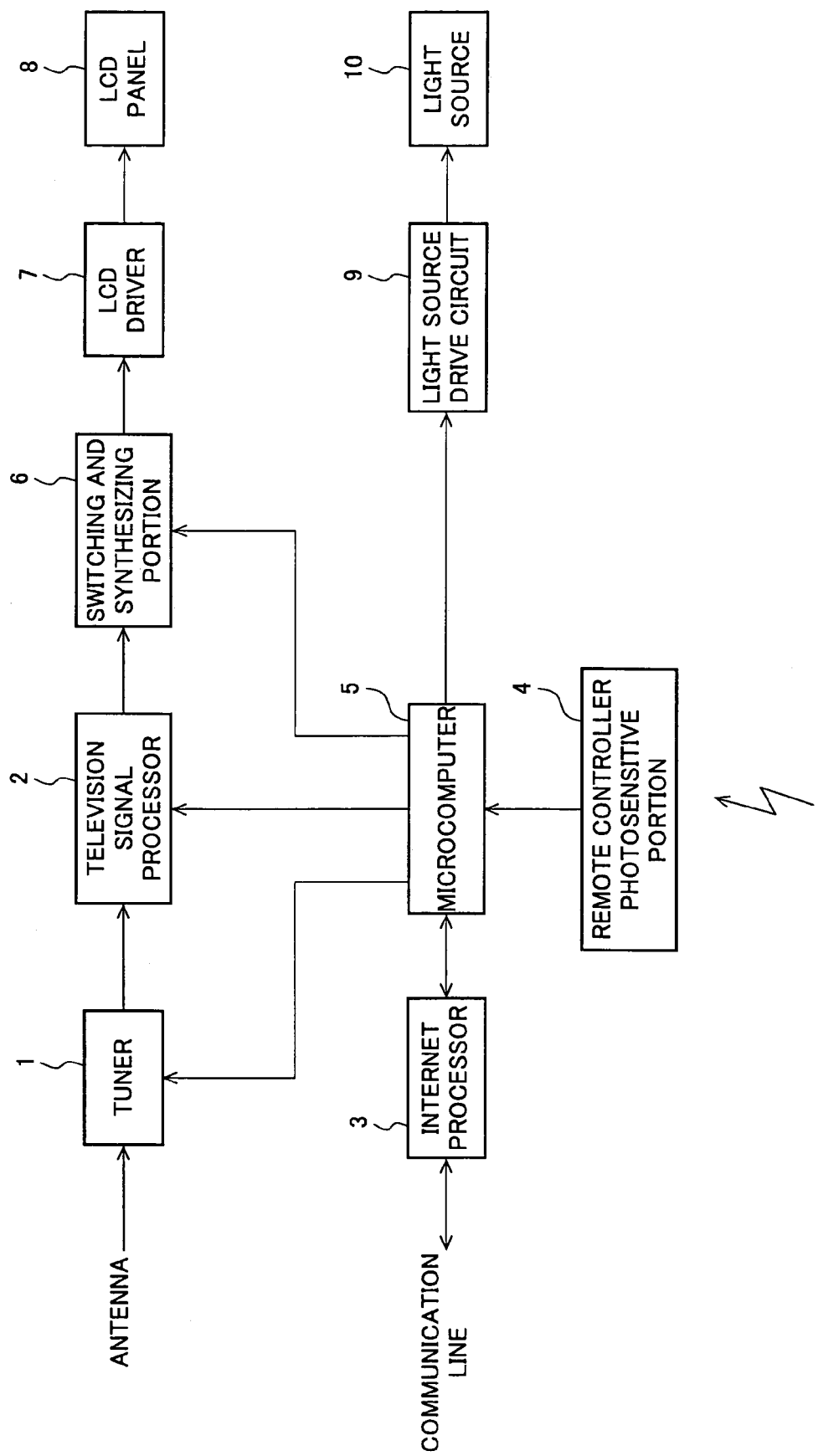
FIG. 23 is a block diagram illustrating a schematic structure of an LCD television receiver in accordance with a third embodiment of the present invention.
Figure 24:
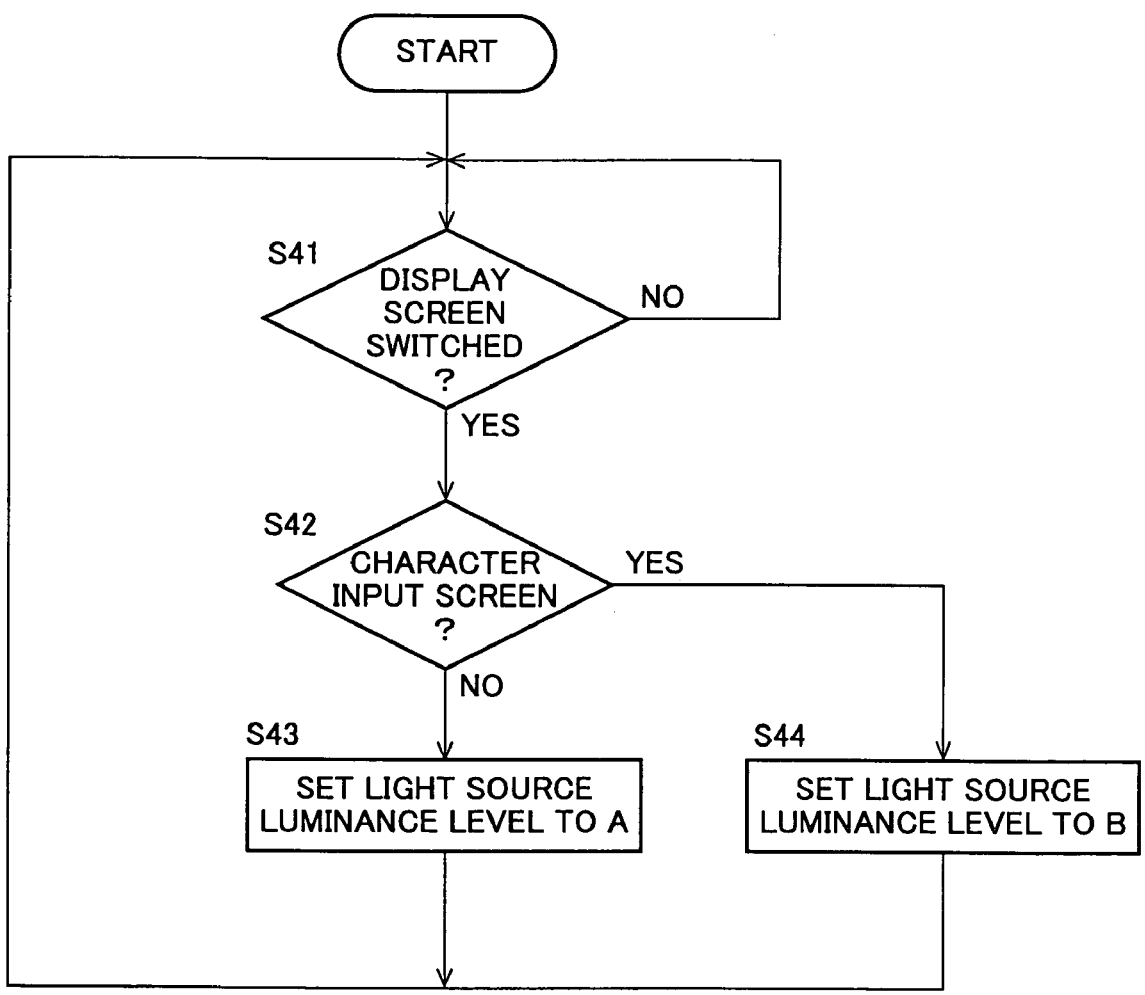
FIG. 24 is a flowchart illustrating control operation of the LCD television receiver in accordance with the third embodiment of the present invention.
Figure 25:
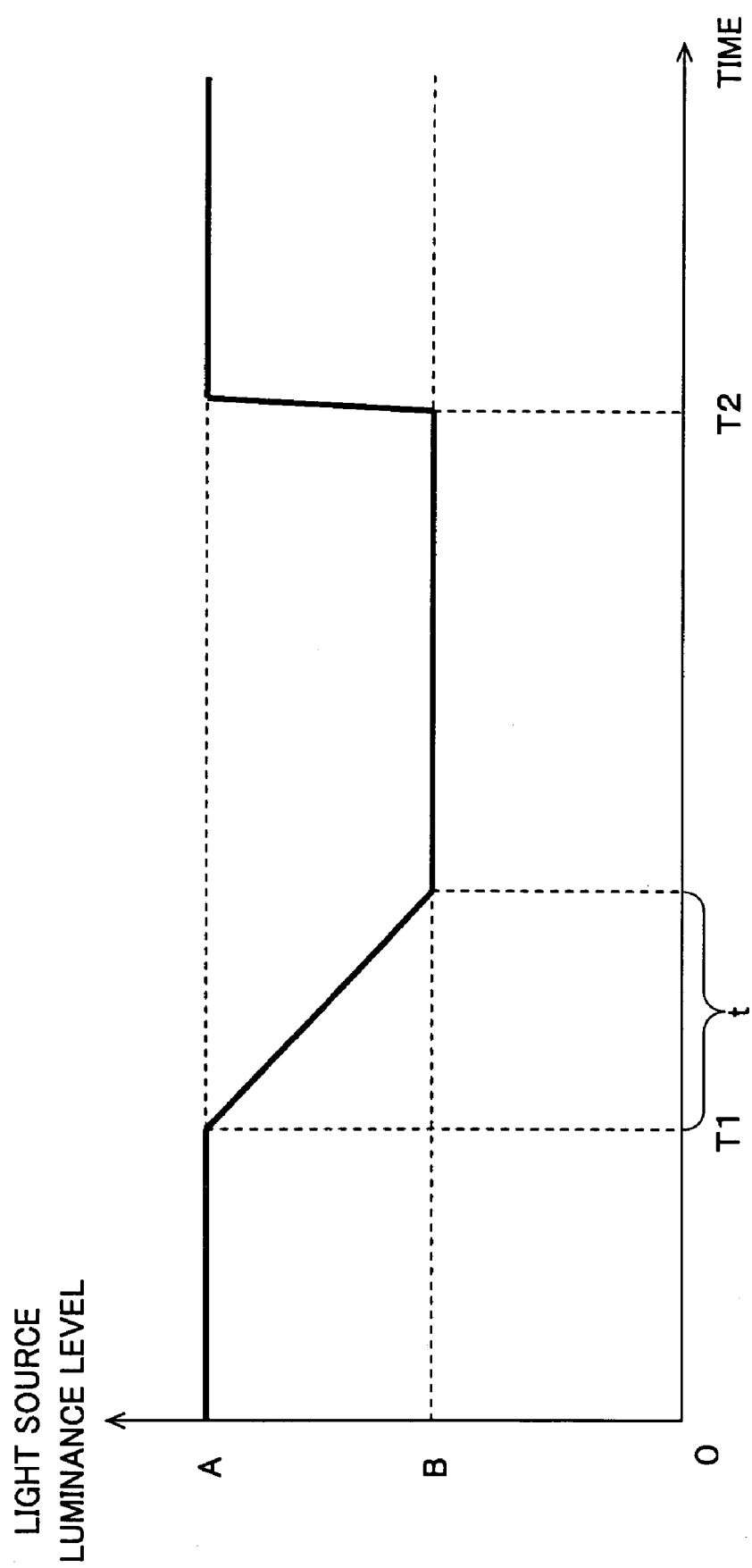
FIG. 25 illustrates the control operation of the LCD television receiver in accordance with the third embodiment of the present invention.
Figure 26:
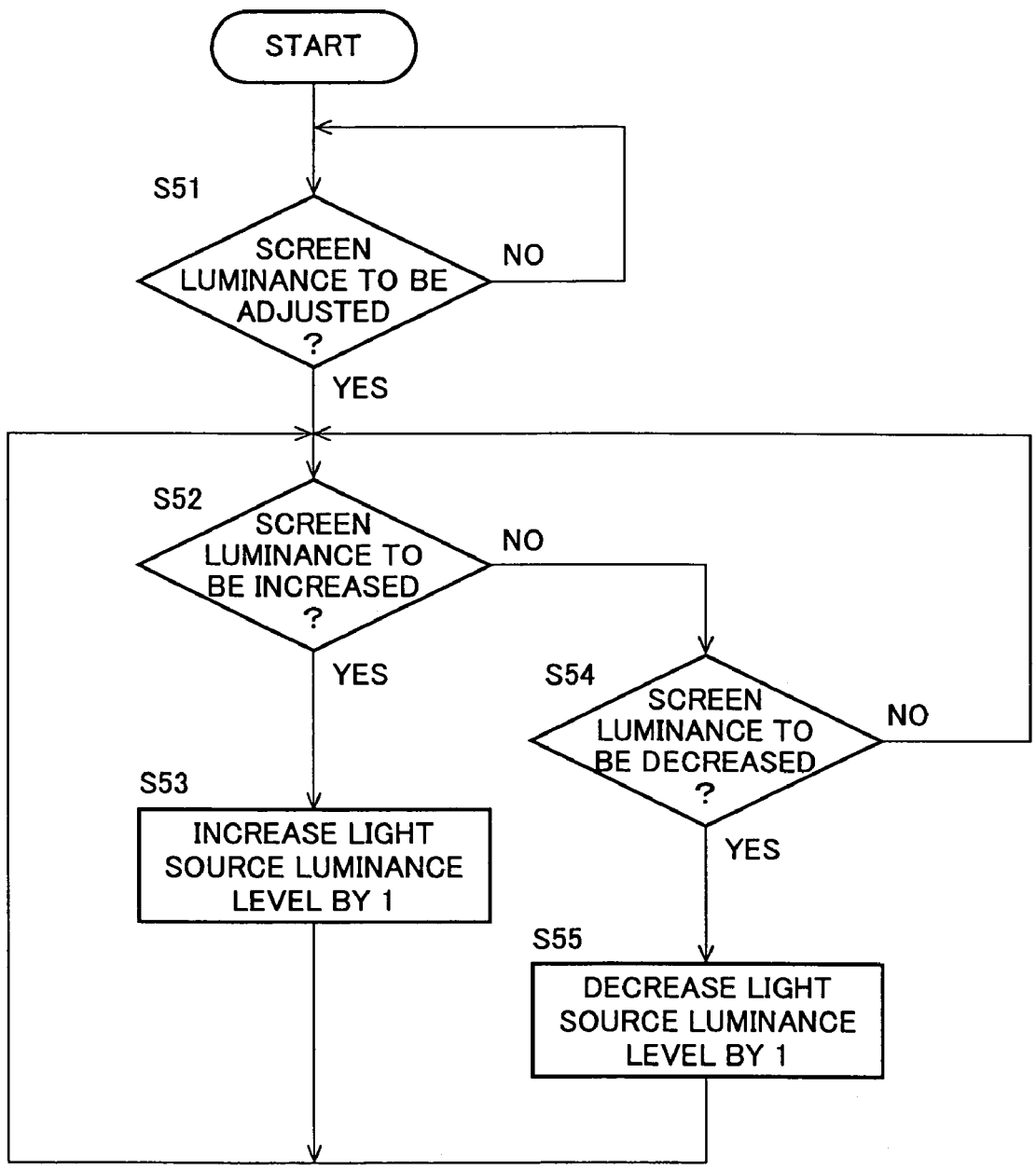
FIG. 26 is a flowchart illustrating the control operation of the LCD television receiver in accordance with the third embodiment of the present invention.

An LCD television receiver as an image display device in accordance with a third embodiment of the present invention is described below with reference to FIGS. 23-27. Like elements of the aforementioned FIG. 1 are designated like reference numerals, and the discussion thereof is omitted herein. FIG. 23 is a block diagram illustrating a schematic structure of the LCD television receiver of the third embodiment. FIG. 24 is a flowchart illustrating control operation of the LCD television receiver of the third embodiment. FIG. 25 illustrates the control operation of the LCD television receiver of the third embodiment. FIG. 26 is a flowchart illustrating the control operation of the LCD television receiver of the third embodiment. FIG. 27 illustrates another control operation of the LCD television receiver of the third embodiment.

As shown in FIG. 23, the LCD television receiver of the third embodiment comprises an LCD driver 7 for driving source lines and gate lines of an LCD panel 8 in response to RGB signals (image display signals) output from a switching and synthesizing portion 6, and a light source drive circuit 9, such as an inverter circuit, for driving the emission of the backlight source 10 in response to a backlight control signal from the microcomputer 5.

The LCD television receiver of the third embodiment may be a directly under backlight type or a side-edge backlight type. The light source 10 may be a widely available cold cathode fluorescent lamp (CCFL) or a light-emitting diode (LED). The control method of luminance of the light source 10 is not limited to voltage (or current) control. The luminance intensity of the light source 10 may be controlled by not only controlling of the duty factor but controlling of a voltage or current.

The microcomputer 5 switches and outputs the screen to be displayed on the LCD panel 8 properly in response to a user setting command while controlling the luminance intensity of the backlight source 10 driven by the light source drive circuit 9. In response to the user setting command, the LCD television receiver of the third embodiment switches between a mode of displaying an ordinary television video and a mode of displaying a video of a screen for inputting character such as an Internet browser screen, an electronic mail browser screen, and a software keyboard screen. In response to the mode switching, the microcomputer 5 controls the light source drive circuit 9, thereby variable controlling the luminance intensity of the backlight source 10, namely, the screen luminance of the liquid crystal panel 8.

The control operation of the screen luminance of the LCD television receiver of the third embodiment is described below with reference to a flowchart of FIG. 24. A user operates the remote controller (not shown) to issue a screen switching instruction (function switching instruction) to switch between a mode of displaying the ordinary television video and a mode of displaying the video of a screen for inputting character such as an Internet browser screen, an electronic mail browser screen, or a software keyboard screen (step S41). In step S42, the microcomputer 5 determines which mode has been selected.

If it is determined that the mode of displaying the ordinary television broadcast program video has been selected, the microcomputer 5 issues a control signal to the light source drive circuit 9 (step S43) so that the luminance intensity level of the backlight source 10 reaches a predetermined value "A" (for example, 10000 cd/m$^2$).

If it is determined in step S42 that the function selection command to select "Internet" or "electronic mail" or the call command to call the "software keyboard" has been issued, the screen displaying the ordinary television broadcast program video is switched to the screen displaying the Internet browser screen, the electronic mail browser screen, or the software keyboard screen, and the microcomputer 5 determines that the mode of displaying the video of a screen for inputting character has been selected.

In this case, the microcomputer 5 issues a control signal to the light source drive circuit 9 in step S44 so that the luminance intensity level of the backlight source 10 reaches a predetermined value "B" (for example, 5000 cd/m$^2$).

In accordance with the third embodiment of the present invention, in response to the user screen switching instruction (function selection setting), the LCD television receiver switches between the mode of displaying the television video and the mode of displaying the video of a screen for inputting character. In response to the mode switching, the microcomputer 5 controls luminance intensity of the light source 10 to an appropriate screen luminance. In particular, in case of displaying the video of a screen for inputting character, such as the video of the Internet browser screen, the electronic mail browser screen, or the software keyboard screen, the microcomputer 5 controls the light source 10 to set the screen luminance level thereof to be lower than the screen luminance level for displaying the ordinary television video. The user is thus free from eye fatigue and a power saving operation is performed.

If the screen luminance sharply varies at the moment of function switching (display screen switching), in particular, if the screen luminance sharply drops at the moment the microcomputer 5 switches from the mode of displaying the television video to the mode of displaying the video of a screen for inputting character, such as the Internet browser screen, the electronic mail browser screen, or the software keyboard screen, the user can feel the change uncomfortable.

In accordance with the third embodiment, as shown in FIG. 25, sufficient time t is permitted before the screen luminance level reaches B from time T1 when mode switching is instructed to switch from the mode of displaying the television broadcast program video to the mode of displaying the video of a screen for inputting character. In this way, a rate of change of screen luminance is slowed (with a large time constant to allow the screen luminance to slowly vary) to free the user from the uncomfortable screen luminance change.

The user typically feels less uncomfortable an increase in the screen luminance that occurs at the moment of switching from the mode of displaying the video of a screen for inputting character to the mode of displaying the television broadcast program video. A short time is permitted before the screen luminance level reaches the level A from time T2 at the moment of switching from the mode of displaying the video of a screen for inputting character to the mode of displaying the television broadcast program video. Preferably, a high-luminance and high-contrast television video is thus immediately displayed.

In accordance with the third embodiment, a manual adjustment control by the user can be performed on the screen luminance in addition to the automatic control responsive to the display screen mode. The user manual adjustment is described below with reference to the flowchart of FIG. 26. In step S51, a user luminance adjustment command is detected when the user selects a luminance adjustment key (not shown) on the remote controller. A luminance adjustment setting OSD (on screen display) is displayed on one edge portion of the screen. In this state, the user selects the up key or the down key on the remote controller to instruct an increase or a decrease in the screen luminance while watching the luminance adjustment setting OSD.

If a luminance increase is instructed with the up key pressed on the remote controller (step S52), the microcomputer 5 issues a control signal to the light source drive circuit 9 (step S53) so that the luminance intensity level of the backlight source 10 reaches a level one notch higher than the preceding level. If a luminance decrease is instructed with the down key pressed on the remote controller (step S54), the microcomputer 5 issues a control signal to the light source drive circuit 9 (step S55) so that the luminance intensity level of the backlight source 10 reaches a level one notch lower than the preceding level.

Taking into consideration the operational environment and the content of a display video, the user can optionally make manual adjustments to the screen luminance that has automatically been set in each of the function screen displays. With this arrangement, the merchantability is achieved.

An illuminance sensor may be arranged to detect ambient illuminance surrounding the LCD television receiver. The screen luminance may be determined based on the detection results of the illuminance sensor and the video display mode. As shown in FIG. 27, during the mode of displaying the television broadcast program video, the luminance intensity level of the light source 10 is $A_1$ if the ambient illuminance is high. The luminance intensity level of the light source 10 is $A_2$ if the ambient illuminance is within a standard range. The luminance intensity level of the light source 10 is $A_3$ if the ambient illuminance is low. Then, the relationship of $A_1>A_2>A_3$ holds. During the mode of displaying the video of a screen for inputting character, the luminance intensity level of the light source 10 is $B_1$ if the ambient illuminance is high. The luminance intensity level of the light source 10 is $B_2$ if the ambient illuminance is within a standard range. The luminance intensity level of the light source 10 is $B_3$ if the ambient illuminance is low. Then, the relationship of $B_1>B_2>B_3$ holds.

In this state, the screen luminance is automatically controlled to a level optimum for each screen display mode taking into consideration the ambient illuminance. With this arrangement, the merchantability is achieved.

In accordance with the third embodiment of the present invention, the screen for inputting character includes any of Internet browser screen, the electronic mail browser screen, and the software keyboard screen. The present invention is not limited to these screens. Any screen is perfectly acceptable as long as the user is permitted to input characters (including numerals, symbols, etc.) while watching the screen, such as a setting screen for inputting a variety of setting values. The software keyboard screen may be used for the user to input a keyword for searching a television program, for example.

In accordance with the third embodiment of the present invention, the function switching instruction (screen switching instruction) is input on the remote controller by the user. Alternatively, the user may give the screen switching instruction by operating a control member (not shown) arranged on the device body of the LCD television receiver.

In accordance with the third embodiment of the present invention, the direct-viewing type LCD has been discussed. The present invention is also applicable to a projection-type LCD. The present invention is further applicable to an image display device of the type that displays images with passive-type light modulating means and a backlight source, and other types of image display devices. The present invention is not limited to the television receiver with an internal television broadcast receiving means. The present invention is applicable to a variety of image display devices such as a personal computer (PC) receiving and displaying a television video, and a mobile communication terminal.

Fourth Embodiment

An LCD television receiver with an internal digital broadcasting receiver as a fourth embodiment of the present invention is described below with reference to FIGS. 28 through 35.

Figure 28:
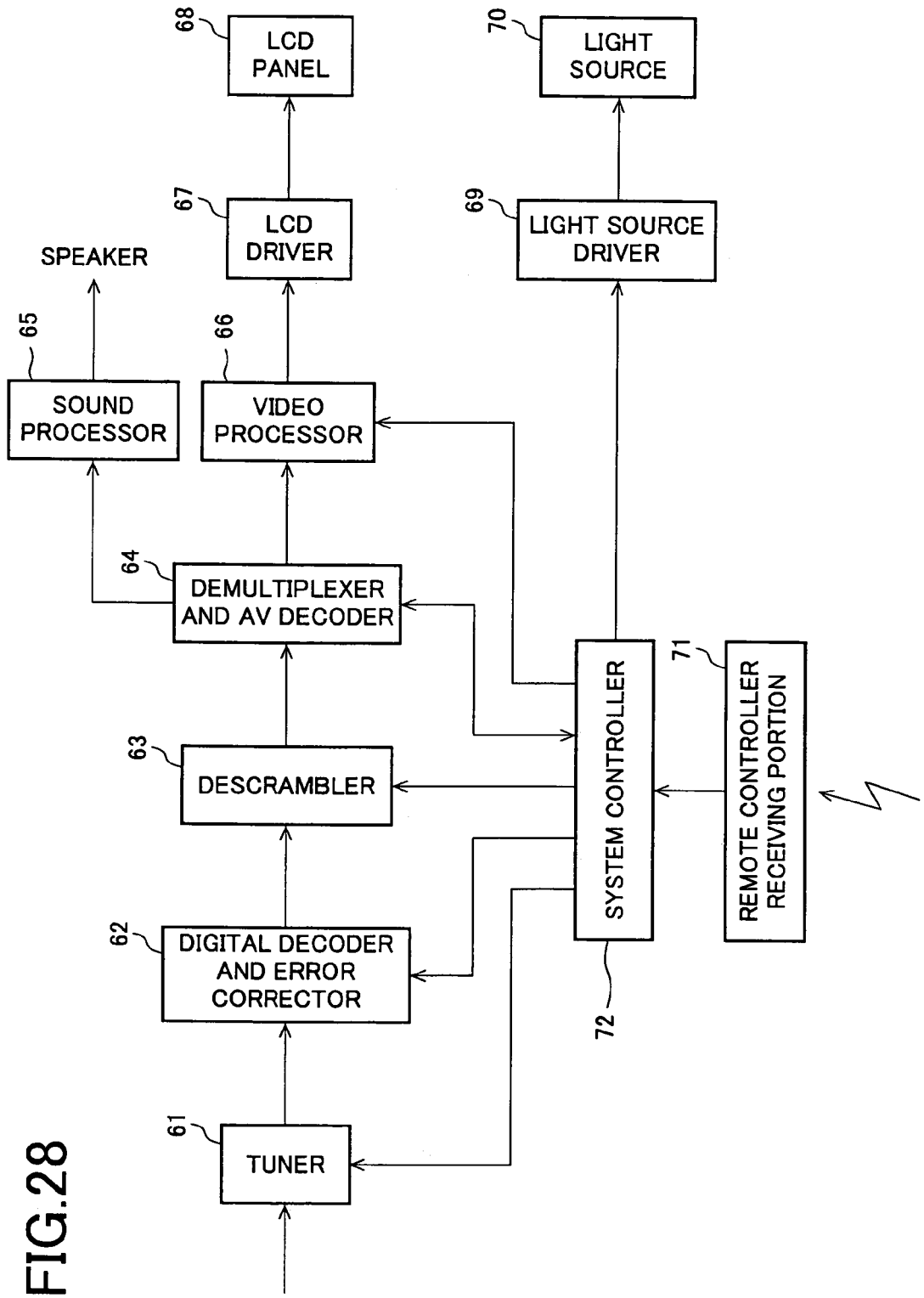
FIG. 28 is a block diagram illustrating a schematic structure of an LCD television receiver in accordance with a fourth embodiment of the present invention.
Figure 29:
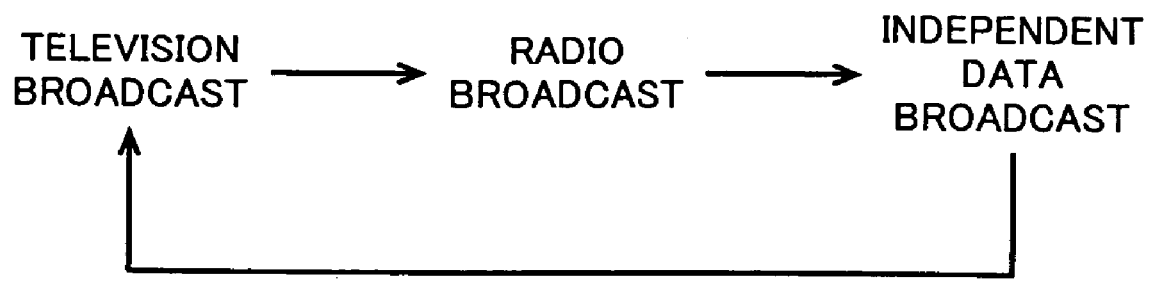
FIG. 29 illustrates a switching operation example for switching broadcast type in accordance with the fourth embodiment of the present invention.
Figure 30:
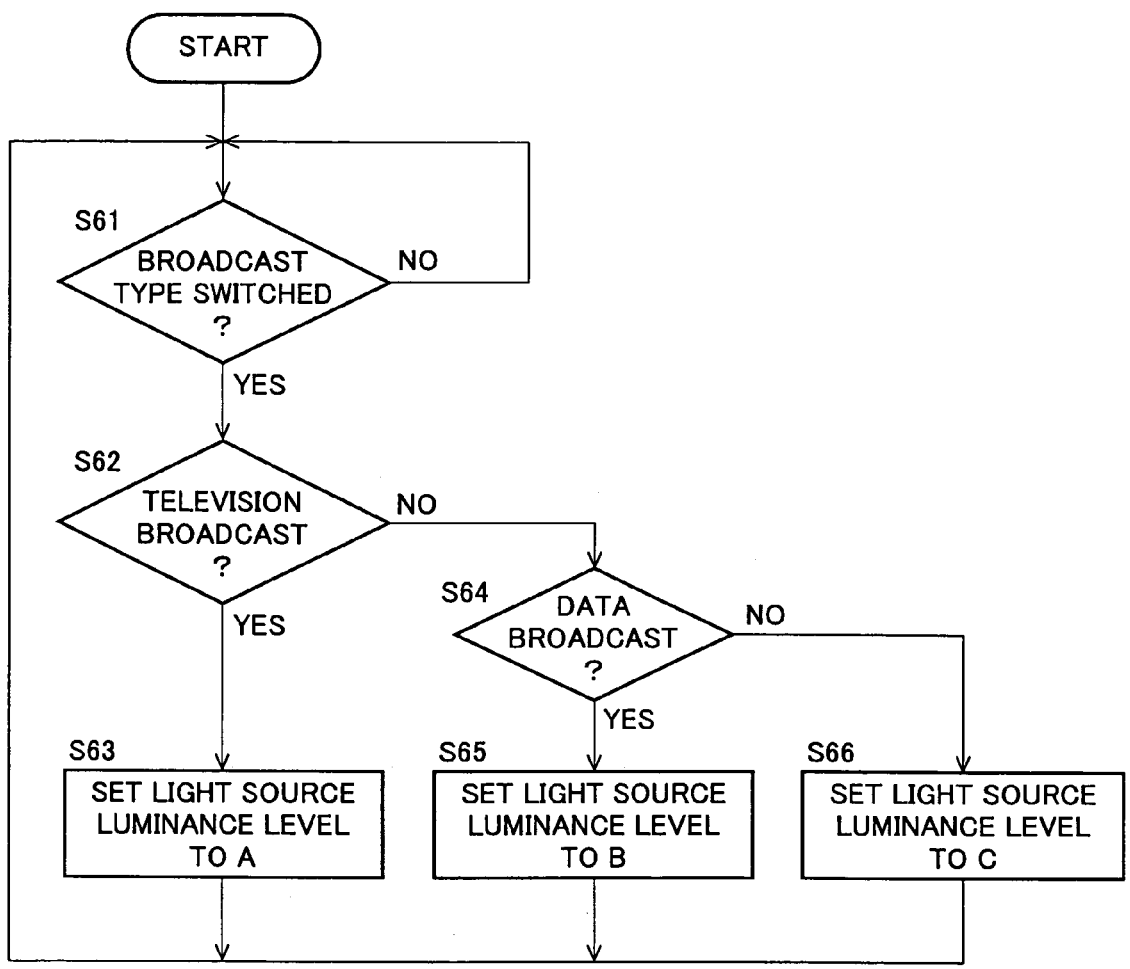
FIG. 30 is a flowchart illustrating control operation of the LCD television receiver in accordance with the fourth embodiment of the present invention.
Figure 31:
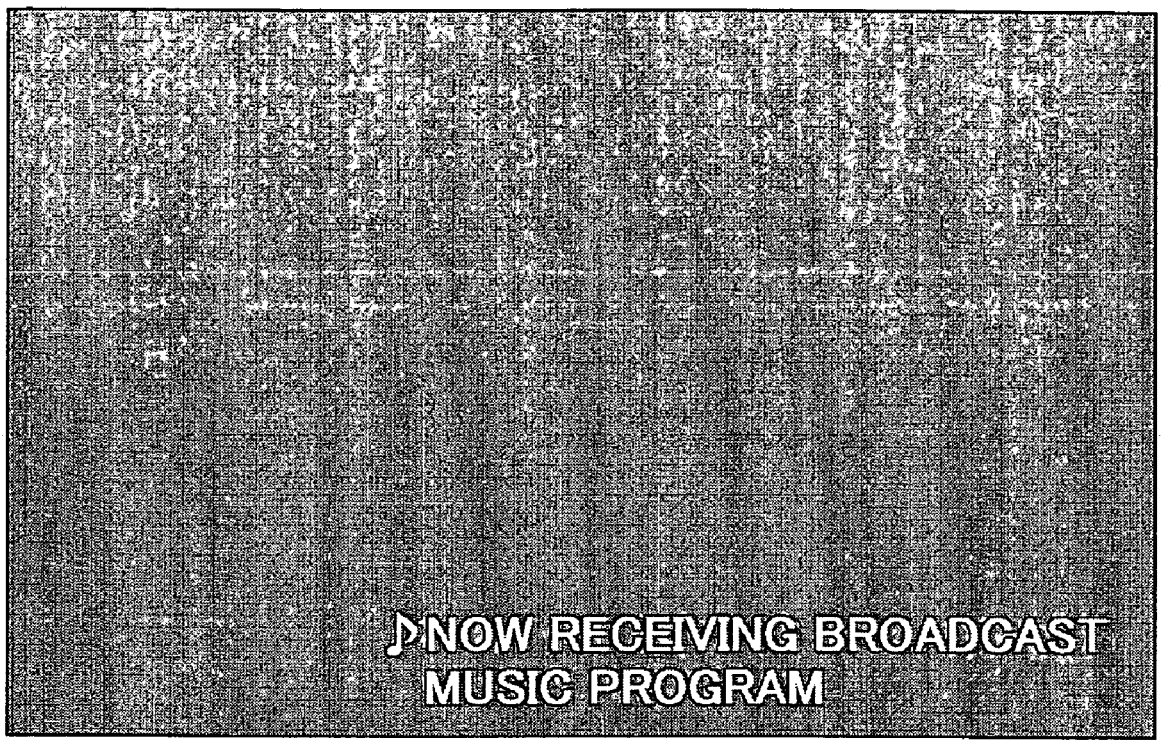
FIG. 31 illustrates a display screen example during a radio broadcast reception in accordance with the fourth embodiment of the present invention.
Figure 32:
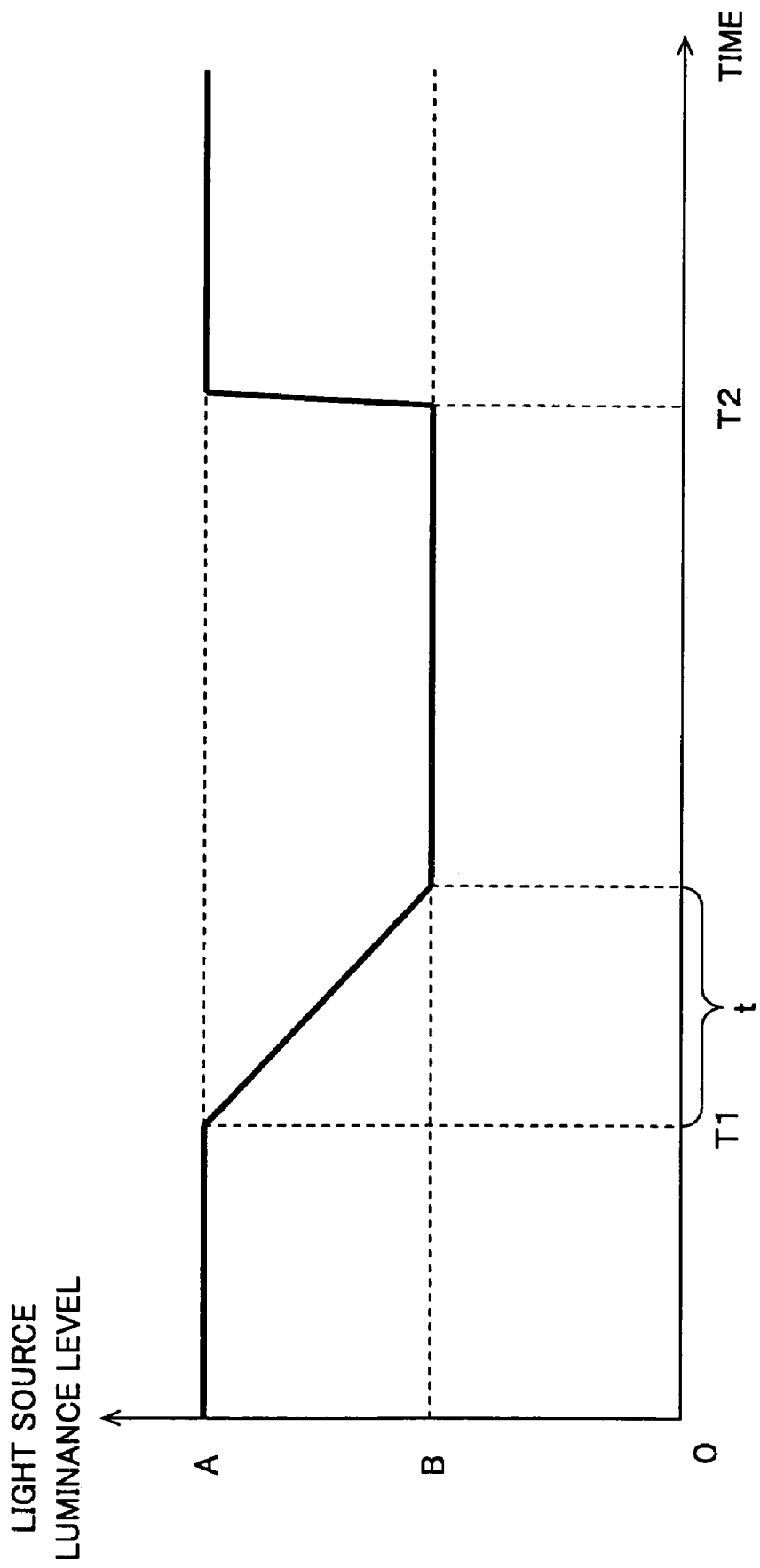
FIG. 32 illustrates the control operation of the LCD television receiver in accordance with the fourth embodiment of the present invention.
Figure 33:
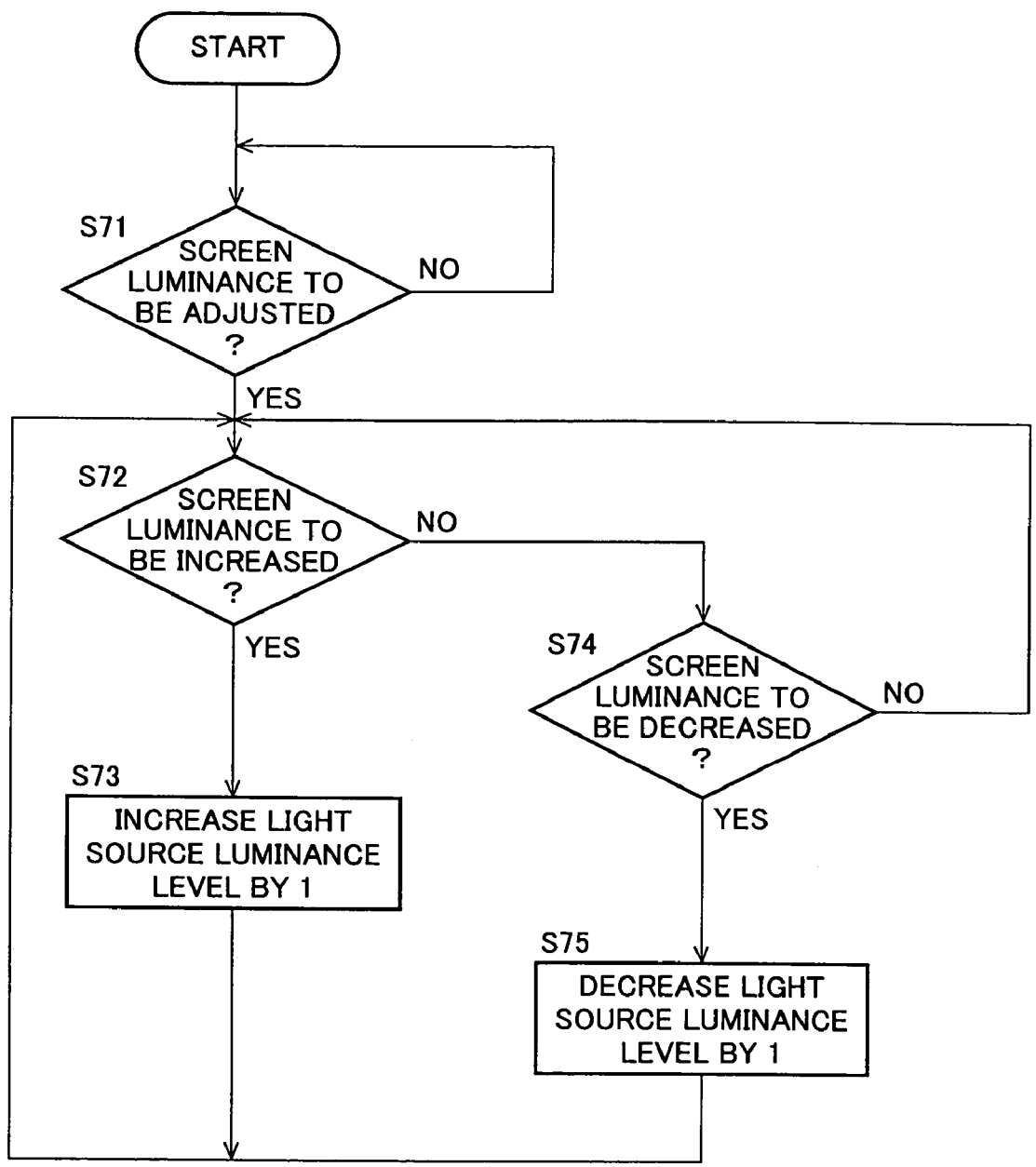
FIG. 33 is a flowchart illustrating the control operation of the LCD television receiver in accordance with the fourth embodiment of the present invention.
Figure 35:
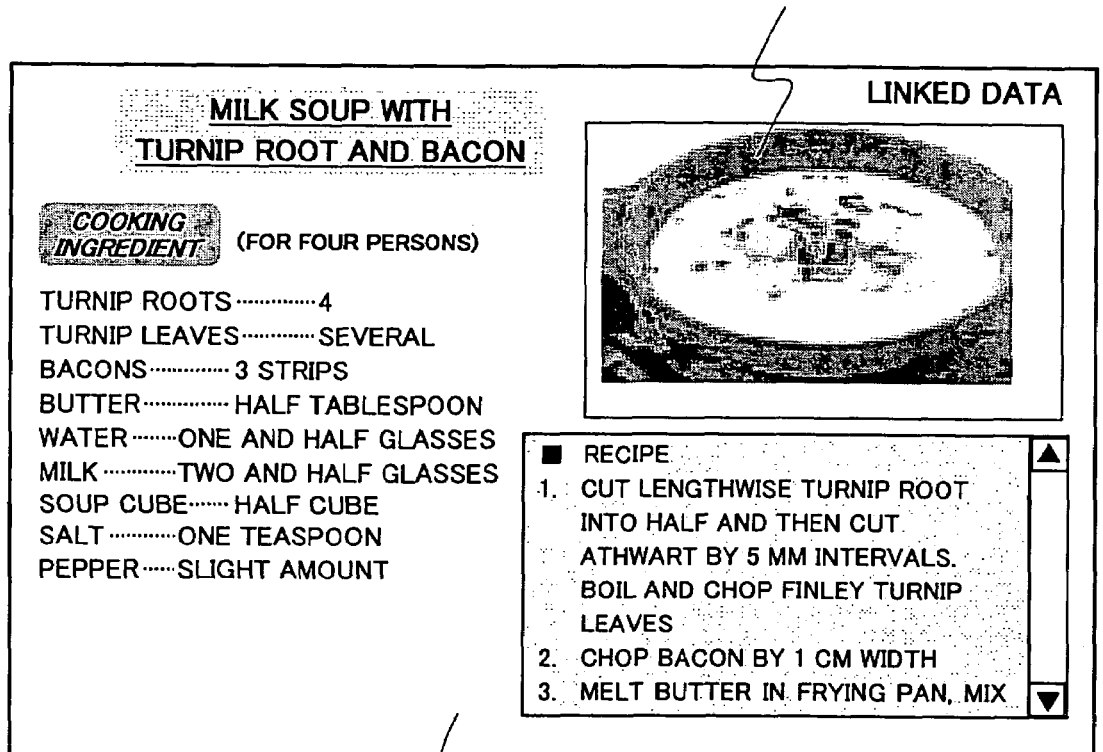
FIG. 35 illustrates a display screen example during a linked-data broadcast reception.

FIG. 28 is a block diagram illustrating a schematic structure of the LCD television receiver of the fourth embodiment. FIG. 29 illustrates a switching operation example for switching broadcast type of the LCD television receiver in accordance with the fourth embodiment. FIG. 30 is a flowchart illustrating the control operation of the LCD television receiver of the fourth embodiment. FIG. 31 illustrates a display screen example during a radio broadcast reception mode of the LCD television receiver in accordance with the fourth embodiment. FIG. 32 illustrates control operation of the LCD television receiver of the fourth embodiment. FIG. 33 is a flowchart illustrating the control operation of the LCD television receiver of the fourth embodiment. FIG. 34 illustrates another control operation of the LCD television receiver of the fourth embodiment. FIG. 35 illustrates a display screen example during a linked-data broadcast reception mode.

As shown in FIG. 28, the LCD television receiver of the fourth embodiment comprises a tuner 61 for converting a digital modulated signal input via a transmission line (not shown) into an in-phase and quadrature (IQ) signal, a digital decoder and error corrector 62 for digitally decoding and error correcting the IQ signal, a descrambler 63 for descrambling the error-corrected digital signal, if scrambled, and a demultiplexer and AV decoder 64 for demultiplexing the descrambled digital signal, separating MPEG coded video and audio signal data, and decoding the separated video and audio signal data into digital video and audio signals.

The LCD television receiver further comprises a sound processor 65, a video processor 66 and an LCD driver 67. The sound processor 65 performs a predetermined process on the audio signal output from the demultiplexer and AV decoder 64, and outputs the resulting audio signal to a loudspeaker. The video processor 66 performs, on the video signal, predetermined processing (including color space conversion process, interlace to progressive (IP) conversion process, scaling process, frame rate conversion (FRC) process, $\gamma$ correction process, color correction process, and synchronization detection process). The LCD driver 67 drives and controls source lines and gate lines of an LCD panel 68 based on the video-processed RGB signals (image display signals).

The LCD television receiver further comprises a backlight source 70, arranged on the back of the LCD panel 68, for backlighting the LCD panel 68, and a light source driver 69, such as an inverter circuit, for driving the backlight source 70. The LCD television receiver of the fourth embodiment may be a directly under backlight type or a side-edge backlight type. The light source 70 may be a widely available cold cathode fluorescent lamp (CCFL) or a light-emitting diode (LED). The control method of luminance of the light source 70 is not limited to voltage (or current) control. The luminance intensity of the light source 70 may be controlled by not only controlling of the duty factor but controlling of a voltage or current.

The LCD television receiver further comprises a remote controller receiving portion 71 for receiving a command signal input to a remote controller (not shown) by a user, and a system controller 72 for detecting and analyzing the command signal received by the remote controller photosensitive portion 71, and outputting predetermined control signals to the tuner 61, the digital decoder and error corrector 62, the descrambler 63, the demultiplexer and AV decoder 64, and the video processor 66. The system controller 72 generates a backlight control signal to be output to the light source driver 69, thereby controlling the backlight source 70 in the light emission process thereof.

In response to a user instruction relating to the broadcast type such as television broadcast, radio broadcast, and data broadcast, the system controller 72 performs program selection on the tuner 61, identifies the broadcast type from reception information extracted by the demultiplexer and AV decoder 64, and thus controls the luminance intensity of the backlight source 70.

When the user operates a broadcast type switch key mounted on the remote controller (not shown), the LCD television receiver of the fourth embodiment selects a desired broadcast type, and then selects a channel on the tuner 61. As shown in FIG. 29, for example, each time the broadcast type switch key is selected, the LCD television receiver cycles through the television broadcast, the radio broadcast, and the independent data broadcast, thereby receiving a program video of the respective broadcast type.

In response to the user instruction, the LCD television receiver of the fourth embodiment switches the broadcast type to be received. In response to the broadcast type switching, the system controller 72 variable controls the light source driver 69, thereby controlling the luminance intensity of the backlight source 70, namely, the screen luminance. Alternatively, based on the information from the demultiplexer and AV decoder 64, the system controller 72 may determine the broadcast type to be received, and may control the luminance intensity of the backlight source 70, namely, the screen luminance.

The control operation of the screen luminance on the LCD television receiver of the fourth embodiment is described below with reference to the flowchart FIG. 30. When the user selects a broadcast type switch key on the remote controller (not shown), a broadcast type switch command is detected (step S61). The system controller 72 analyzes in step S62 whether the commanded broadcast type is a television broadcast. If it is determined that a switch command to the television broadcast is issued, the system controller 72 determines that a program video of the television broadcast is to be displayed. In step S63, the system controller 72 thus outputs a control signal to the light source driver 69 so that the luminance intensity level of the backlight source 70 reaches a predetermined value "A".

The system controller 72 determines in step S64 whether the commanded broadcast type is a data broadcast. If the command to switch to the data broadcast has been issued, the system controller 72 determines that a program video of the data broadcast is to be displayed. In step S65, the system controller 72 outputs a control signal to the light source driver 69 so that the luminance intensity level of the backlight source 70 reaches a predetermined value "B". The predetermined value B is smaller than the predetermined value A.

Thus, the screen luminance may be set to be lower when the program video of the data broadcast is displayed than when the program video of the television broadcast is displayed. Accordingly, the screen luminance of the video screen for mainly displaying text information such as program description or news is set to be low, thereby freeing the user from eye fatigue and performing a power saving operation.

If it is determined in step S64 that the switching command of the broadcast type does not indicate the data broadcast, the system controller 72 determines that a program video of the radio broadcast is to be displayed. In step S66, the system controller 72 outputs a control signal to the light source driver 69 so that the luminance intensity level of the backlight source 70 reaches a predetermined value C. The predetermined value C is smaller than the predetermined value B.

When a program video of the radio broadcast with visual information thereof relatively less important is displayed, the screen luminance is set to be even lower than the screen luminance for the program video of the television broadcast and the data broadcast. The power consumption of the LCD television receiver is further reduced.

The radio broadcast includes one type for broadcasting a radio program permitting one of an image or data linked to an audio program to be displayed, and the other type for broadcasting an audio only radio program. When the radio broadcast permitting one of the image and the data linked to the audio program to be displayed is selected and received, the system controller 72 may control the light source driver 69 as in the reception of the data broadcast program so that the luminance intensity level of the backlight source 70 reaches the predetermined value B.

When the audio only radio program is selected and received, the backlight source 70 may be entirely extinguished to save power. To prevent the user from mistaking an extinguished backlight source 70 for any malfunction, however, the backlight source 70 is sufficiently dimmed and the user is preferably alerted to an OSD (on screen display), as shown in FIG. 31, indicating that an audio only radio program is currently received. To save power, a light source corresponding to a portion of the screen area displaying the OSD (a bottom right corner area of the screen as shown in FIG. 31) is lit while the light source of the remaining screen area is extinguished.

In accordance with the fourth embodiment of the present invention, the luminance of the backlight is controlled so that the received program video is displayed at the appropriate screen luminance in accordance with the broadcast type responsive to the user selection command. The LCD television receiver thus displays the screen in a luminance level causing no eye fatigue to the user and in a power-saving manner. Particularly, in response to the mode switching between the mode of displaying the television broadcast program video and the mode of displaying the data broadcast program video, the LCD television receiver controls the luminance intensity of the backlight source. Appropriate screen luminance is thus provided at each mode.

If the screen luminance sharply varies at the moment the broadcast type is switched, in particular, if the screen luminance sharply drops at the moment the LCD television receiver switches from the mode of displaying the television broadcast program video to the mode of displaying the data broadcast program video, the user can feel the drop uncomfortable.

In accordance with the fourth embodiment, as shown in FIG. 32, a sufficient time t is permitted before the screen luminance level reaches B from time T1 when mode switching is instructed to switch from the mode of displaying the television broadcast program video to the mode of displaying the data broadcast program video. In this way, a rate of change of screen luminance is slowed (with a large time constant to allow the screen luminance to slowly vary) to free the user from the uncomfortable luminance change.

The user typically feels less uncomfortable an increase in the screen luminance that occurs at the moment of switching the mode of displaying the data broadcast program video to the mode of displaying the television broadcast program video. A short time is permitted before the screen luminance level reaches the level A from time T2 when mode switching is instructed to switch from the mode of displaying the data broadcast program video to the mode of displaying the television broadcast program video. Preferably, a high-luminance television video is thus immediately displayed.

In accordance with the fourth embodiment, a manual adjustment control by the user may be performed on the screen luminance in addition to the automatic adjustment responsive to the broadcast type being received and selected. The user manual adjustment is described below with reference to the flowchart of FIG. 33. In step S71, a user luminance adjustment command is detected when the user selects a luminance adjustment key on the remote controller (not shown). A luminance adjustment setting OSD (on screen display) is displayed on one edge portion of the screen. In this state, the user selects the up key or the down key on the remote controller to instruct an increase or a decrease in the screen luminance while watching the luminance adjustment setting OSD screen.

If a luminance increase is instructed with the up key pressed on the remote controller (step S72), the system controller 72 issues a control signal to the light source driver 69 (step S73) so that the luminance intensity level of the backlight source 70 reaches a level one notch higher than the preceding level. If a luminance decrease is instructed with the down key pressed on the remote controller (step S74), the system controller 72 issues a control signal to the light source driver 69 (step S75) so that the luminance intensity level of the backlight source 70 reaches a level one notch lower than the preceding level.

Taking into consideration the operational environment and the content of a display video, the user can optionally make manual adjustments to the screen luminance that has been automatically set in response to the each broadcast type. With this arrangement, the merchantability is achieved.

An illuminance sensor may be arranged to detect ambient illuminance surrounding the LCD television receiver. The screen luminance may be determined based on the detection results of the illuminance sensor and the received broadcast type. As shown in FIG. 34, for example, during the mode of displaying the television broadcast program video, the luminance intensity level of the light source 70 is $A_1$ if the ambient illuminance is high. The luminance intensity level of the light source 70 is $A_2$ if the ambient illuminance is within a standard range. The luminance intensity level of the light source 70 is $A_3$ if the ambient illuminance is low. Then, the relationship of $A_1 > A_2 > A_3$ holds. During the mode of displaying the video of data broadcast program, the luminance intensity level of the light source 70 is $B_1$ if the ambient illuminance is high. The luminance intensity level of the light source 70 is $B_2$ if the ambient illuminance is within the standard range. The luminance intensity level of the light source 70 is $B_3$ if the ambient illuminance is low. Then, the relationship of $B_1 > B_2 > B_3$ holds.

During the display mode of the radio program, the luminance intensity level of the light source 70 is set to $C_1$ if ambient illuminance is high; the luminance intensity level of the light source 70 is set to $C_2$ if ambient illuminance is within a standard range; and the luminance intensity level of the light source 70 is set to $C_3$ if the ambient illuminance is low. Here, the relationship of $C_1 > C_2 > C_3$ holds.

Depending on the ambient illuminance level, the screen luminance of the light source 70 can be automatically controlled to an optimum level appropriate for the display mode linked to each broadcast type. With this arrangement, the merchantability is achieved.

The aforementioned data broadcast type includes independent data broadcasting for broadcasting data only, and linked-data broadcasting for broadcasting data linked to one of television and radio programs of digital broadcasting. When the linked-data broadcasting is received, the user may operate a linked-data display key arranged on the remote controller to receive information linked to one of a television broadcast program and a radio broadcast program, each currently received. The linked-data is thus displayed on the LCD television receiver.

If the user selects the linked-data display key during reception of a television broadcast program, an OSD indicating that data reception is in progress is displayed. As shown in FIG. 35, the user can switch to a display screen of the data broadcast program having a current television broadcast program as an inset video. In this case, as well, the backlight source 70 is preferably controlled to a screen luminance level of B.

If the backlight source which can change in luminance intensity in response to the screen area is used, the luminance intensity of the backlight source corresponding to the inset video of the television broadcast program video currently received is set to be high while the luminance intensity of the backlight source corresponding to the other screen area displaying the data broadcast program video may be set to be low.

In accordance with the aforementioned fourth embodiment, the luminance intensity of the backlight source 70 can be dynamically variable controlled in response to video characteristics such as an average picture level (APL) of each video frame to achieve crispness and contrast in displaying a moving image. In this case, the maximum luminance intensity of the backlight source 70 may be set depending on a broadcast type of the program video to be displayed.

The direct-viewing type LCD has been discussed in the fourth embodiment of the present invention. The present invention is also applicable to a projection-type LCD. The present invention is also applicable to an image display device of the type that displays images with passive-type light modulating means and a backlight source, and other types of image display devices. The input switching setting is performed in response to an operation performed on the remote controller by the user. Alternatively, the user may perform the input switching setting by operating a control member (not shown) arranged on the device body of the LCD television receiver.

The LCD television receiver having digital broadcast program receiving means has been discussed as the fourth embodiment of the present invention. The present invention is not limited to this arrangement. Even if digital broadcast program receiving means is external to the LCD television receiver, the broadcast type of the program video to be displayed is detected from the content of user command to the external digital broadcast program receiving means or information relating to the reception from the external digital broadcast program receiving means. The screen luminance is thus variable controlled based on the detection result.

The invention claimed is:

1. An image display device switchable between a mode of displaying a television image and a mode of displaying a graphic user interface image based on a screen switch command from a user, wherein the image display device comprises a controller which carries out variable control of a screen luminance in response to the mode switching, and the image display device lowers the screen luminance when the mode of displaying the graphic user interface image is selected than the screen luminance when the mode of displaying a television image is selected, wherein the controller slows a rate of change in the screen luminance at the moment of switching from the mode of displaying the television image to the mode of displaying the graphic user interface image than a rate of change in the screen luminance at the moment of switching from the mode of displaying the graphic user interface image to the mode of displaying the television image.

2. The image display device according to claim 1, wherein the controller varies luminance intensity of a backlight source for backlighting a passive-type light modulator that displays an input image signal.

3. The image display device according to claim 1, wherein the graphic user interface image is an electronic program guide display image.

4. The image display device according to claim 1, wherein the graphic user interface image is a variety of setting menus display image.

5. An image display device switchable between a mode of displaying a television image and a mode of displaying a computer image based on a input switch command from a user, wherein the image display device comprises:
   a passive-type light modulator displaying an input image signal through a backlight source; and
   a controller which carries out variable control of luminance intensity of the backlight source in response to the mode switching; and
   the image display device lowers the luminance intensity of the backlight source when the mode of displaying the computer image is selected than the luminance intensity of the backlight source when the mode of displaying the television image is selected,
   wherein the controller slows a rate of change in the luminance intensity of the backlight source at the moment of switching from the mode of displaying the television image to the mode of displaying the computer image than a rate of change in the luminance intensity of the backlight source at the moment of switching from the mode displaying the computer image to the mode of displaying the television image is selected.

6. An image display device switchable between a mode of displaying a television image and a mode of displaying an image of a screen for inputting character based on a screen switch command from a user, wherein the image display device comprises a controller which carries out variable control of a screen luminance in response to the mode switching, and
   the image display device lowers the screen luminance when the mode of displaying an image of a screen for inputting character is selected than the screen luminance when the mode of displaying a television image is selected,
   wherein the controller slows a rate of change in the screen luminance at the moment of switching from the mode of displaying the television image to the mode of displaying the image of a screen for inputting character than a rate of change in the screen luminance at the moment of switching from the mode of displaying the image of a screen for inputting character to the mode of displaying the television image.

7. The image display device according to claim 6, wherein the controller varies luminance intensity of a backlight source for backlighting a passive-type light modulator that displays an input image signal.

8. The image display device according to claim 6, wherein the screen for inputting character is an Internet browser screen.

9. The image display device according to claim 6, wherein the screen for inputting character is an electronic mail browser screen.

10. The image display device according to claim 6, wherein the screen for inputting character is a software keyboard screen.

11. A television receiver comprising:
    a receiver receiving either of at least television broadcast or data broadcast based on a screen switch command from a user; and
    a display displaying a program image relating to a broadcast received by the receiver;
    wherein the television receiver comprises a controller which carries out variable control of a screen luminance of the display in response to a broadcast type of the program image, and the television receiver lowers the screen luminance at the moment of displaying the program image relating to the data broadcast than the screen luminance at the moment of displaying the program image relating to the television broadcast,
    wherein the controller slows a rate of change in the screen luminance at the moment of switching from the screen luminance in displaying the program image of the television broadcast to the screen luminance in displaying the program image of the data broadcast than a rate of change in the screen luminance at the moment of switching from the screen luminance in displaying the program image of the data broadcast to the screen luminance in displaying the program image of the television broadcast.

12. The television receiver according to claim 11, wherein the plurality of broadcast types further comprises a radio broadcast, and
    wherein the controller lowers the screen luminance of the program image of the radio broadcast than the screen luminance of the program image of the data broadcast.

13. The television receiver according to claim 11, wherein the controller varies luminance intensity of a backlight source for backlighting a passive-type light modulator that displays an input image signal.

14. An image display device switchable between a mode of displaying a television image and a mode of displaying a graphic user interface image based on a screen switch command from a user, wherein the image display device comprises a controller which carries out variable control of a screen luminance in response to the mode switching, and the controller slows a rate of change in the screen luminance at the moment of switching from the mode of displaying the television image to the mode of displaying the graphic user interface image than a rate of change in the screen luminance at the moment of switching from the mode of displaying the graphic user interface image to the mode of displaying the television image.

15. An image display device switchable between a mode of displaying a television image and a mode of displaying a computer image based on an input switch command from a user, wherein the image display device comprises:
    a passive-type light modulator displaying an input image signal through a backlight source; and
    a controller which carries out variable control of luminance intensity of the backlight source in response to the mode switching,
    wherein the controller slows a rate of change in the luminance intensity of the backlight source at the moment of switching from the mode of displaying the television image to the mode of displaying the computer image than a rate of change in the luminance intensity of the backlight source at the moment of switching from the mode displaying the computer image to the mode of displaying the television image is selected.

16. An image display device switchable between a mode of displaying a television image and a mode of displaying an image of a screen for inputting character based on a screen switch command from a user, wherein the image display device comprises a controller which carries out variable control of a screen luminance in response to the mode switching and, the controller slows a rate of change in the screen luminance at the moment of switching from the mode of displaying the television image to the mode of displaying the image of a screen for inputting character than a rate of change in the screen luminance at the moment of switching from the mode of displaying the image of a screen for inputting character to the mode of displaying the television image.

17. A television receiver comprising:

a receiver receiving either of at least television broadcast or data broadcast based on a screen switch command from a user; and a display displaying a program image relating to a broadcast received by the receiver;

wherein the television receiver comprises a controller which carries out variable control of a screen luminance of the display in response to a broadcast type of the program image, and the controller slows a rate of change in the screen luminance at the moment of switching from the screen luminance in displaying the program image of the television broadcast to the screen luminance in displaying the program image of the data broadcast than a rate of change in the screen luminance at the moment of switching from the screen luminance in displaying the program image of the data broadcast to the screen luminance in displaying the program image of the television broadcast.

\* \* \* \* \*